(12) United States Patent
Menezo et al.

(10) Patent No.: US 9,654,317 B2
(45) Date of Patent: May 16, 2017

(54) MODULATING SYSTEM ADAPTED TO GENERATE A MULTI-LEVEL QUADRATURE AMPLITUDE MODULATION

(71) Applicant: COMMISSARIAT A L'ENERGIE ATOMIQUE ET AUX ENERGIES ALTERNATIVES, Paris (FR)

(72) Inventors: Sylvie Menezo, Voiron (FR); Giovanni Beninca De Farias, Porto Alegre (BR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/057,846

(22) Filed: Mar. 1, 2016

(65) Prior Publication Data

US 2016/0261439 A1 Sep. 8, 2016

(30) Foreign Application Priority Data

Mar. 2, 2015 (FR) ...................................... 15 51730

(51) Int. Cl.
| | | |
|---|---|---|
| *H04B 10/516* | (2013.01) | |
| *H04L 25/49* | (2006.01) | |
| *H04B 10/50* | (2013.01) | |
| *H04B 10/54* | (2013.01) | |

(52) U.S. Cl.
CPC ..... *H04L 25/4921* (2013.01); *H04B 10/5053* (2013.01); *H04B 10/516* (2013.01); *H04B 10/541* (2013.01)

(58) Field of Classification Search
CPC .... H04B 10/505; H04B 10/504; H04B 10/58; H04B 10/50; H04B 10/502; H04B 10/5053; H04B 10/541; H04B 10/516; H04L 25/4921
See application file for complete search history.

(56) References Cited

U.S. PATENT DOCUMENTS

| | | | |
|---|---|---|---|
| 8,588,556 B1 | 11/2013 | Dong | |
| 2010/0221166 A1* | 9/2010 | Muggli | B01D 53/83 423/245.1 |

(Continued)

OTHER PUBLICATIONS

French Search Report, dated Feb. 3, 2016, from corresponding French Application.

(Continued)

*Primary Examiner* — Ted Wang
(74) *Attorney, Agent, or Firm* — Young & Thompson

(57) ABSTRACT

A modulating system (14) adapted to generate a multi-level quadrature amplitude modulation, includes:
a first number of first optical channels (24_1), each of the first optical channels (24_1) including a modulating device (28), and a second number of first optical channels (24_1) each including a first phase shifting unit capable of introducing a phase shift of $\pi$, and
a first number of second optical channels (24_2), each of the second optical channels (24_2) being associated bijectively with one of the first optical channels (24_1), each of the second optical channels (24_2) including the same elements as the first optical channel (24_1) with which the second optical channel (24_2) is associated and a second phase shifting unit able to introduce a phase shift of $\pi/2$.

10 Claims, 19 Drawing Sheets

(56) References Cited

U.S. PATENT DOCUMENTS

2014/0328601 A1    11/2014    Cavaliere
2015/0372755 A1*  12/2015    Chung .............. H04B 10/25133
                                                             398/188

OTHER PUBLICATIONS

Takashi Goh et al: "Novel flexible-format optical modulator with selectable combinations of carrier numbers and modulation levels based on silica-PLC and LiNbO 3 hybrid integration", 2011 Optical Fiber Communication Conference and Exposition and the National Fiber Optic Engineers Conference (OFC/NFOEC 2011) : Los Angeles, California, USA, Mar. 6-10, 2011, IEEE, Piscataway, NJ, USA, Mar. 6, 2011 (Mar. 6, 2011), pp. 1-3, XP031946713, ISBN: 978-1-4577-0213-6.

* cited by examiner

MODULATING SYSTEM ADAPTED TO GENERATE A MULTI-LEVEL QUADRATURE AMPLITUDE MODULATION

The present invention claims the priority of document FR 15 51730, which is incorporated herein by reference.

TECHNICAL FIELD OF THE INVENTION

The present invention relates to a modulating system adapted to generate a multi-level quadrature amplitude modulation that can be shown by a constellation with $4^k$ states, k being a positive integer greater than or equal to 2. The present invention also relates to an associated architecture.

BACKGROUND OF THE INVENTION

In the field of optical transmissions, it is known to use modulation techniques to send symbols carrying one or more information bits. The modulation techniques make it possible to encode one or more bits over the amplitude and the phase of the field of an optical carrier.

Among modulation techniques, multilevel quadrature amplitude modulation is particularly interesting. Such modulation techniques are called M-QAM for M-quadrature amplitude modulation, where $M=2^k$ and k is an integer greater than or equal to 1. The integer k represents the number of bits per symbol.

There are different systems for performing such so-called multilevel amplitude modulations.

It is in particular known to use a modulating system comprising Mach-Zehnder modulators in a so-called I-Q configuration. The modulating system includes an optical power divider with one input to two outputs, each coupled to a Mach-Zehnder modulator, each of the outputs of the Mach-Zehnder modulators being coupled to the two inputs of an optical power combiner (two inputs to one output). The input optical power divider separates an incident optical carrier into two power waves divided by 2, each wave supplying a respective Mach-Zehnder modulator. Each of these two Mach-Zehnder modulators generates a pure amplitude modulation with N levels, N being an integer. The wave propagating in the second Mach-Zehnder modulator is phase shifted relative to the wave propagating in the first Mach-Zehnder modulator using an appropriate phase shifting unit. Thus, two different waves are generated that are phase shifted by $\pi/2$ relative to one another, which corresponds to providing two orthogonal components, one being a real component (I) and the other being an imaginary component (Q). These two components are summed at the output coupler. The amplitude of the output signal is modulated with a number of possible states of the signal of 2×N. The obtained optical carrier is modulated by a signal called 2N-QAM. The team of P. DONG et al. demonstrated the feasibility of such a modulation on a silicon Mach-Zehnder modulator to obtain 16 QAM (see in particular the article titled "224-*Gb/S PDM*-16-*QAM Modulator and Receiver based on Silicon Photonic Integrated Circuits*", OFC NOFOEC 2013 paper PDP5C.6).

To generate such 2N-QAM signals, Mach-Zehnder modulators made from lithium niobate are commonly used. Such Mach-Zehnder modulators are commercially available and make it possible to obtain a pure amplitude modulation. With such a device, one skilled in the art knows the relationship between the electrical modulation signal and the amplitude of the optical field, which is a linear relationship once the Mach-Zehnder is powered by an appropriate DC voltage. As a result, the entire modulation space I and Q can be reached.

However, such a modulating system implies, for each Mach-Zehnder modulator, converting a first signal coding a single bit per symbol into a second signal coding several bits per symbol. In order to implement this function, the modulating system for example includes one digital-analog converter per Mach-Zehnder modulator. In practice, each digital-analog converter has imperfections (in particular in terms of resolution) that can cause the deterioration of the overall performance of the modulating system. Furthermore, the Mach-Zehnder modulators have the drawback of being large and consuming large quantities of electricity compared to a resonant ring modulator.

In order to offset these drawbacks, other assemblies have been proposed based on resonant ring modulators, which have the advantage relative to the Mach-Zehnder of being smaller in size and consuming less electricity. Since the ring modulator alone does not allow a pure amplitude modulation, it has been proposed by the same authors as above to use an assembly with two rings instead of Mach-Zehnder modulators forming modulators of the PSK (Phase-Shift Keying) type.

However, such a device is limited to a four-state modulation.

In an article by Y. EHRLICHMAN et al. titled "*Generating arbitrary optical signal constellations using microring resonators*", from the journal Optics Express, Volume 21, no. 3, page 3791 to 3799 from February 2013 and in an article by R INTEGLIA et al. titled "*Parallel-coupled dual racetrack silicon resonators for quadrature amplitude modulation*", from the review Optics express, volume 19, no. 16 pages 14,892 to 14,902, dated 2011, it is proposed to use to resonant ring modulators in series, the first performing an intensity modulation and the second performing a phase modulation.

However, for the phase modulation, the ring size is several hundreds of microns, which causes a reduction in the modulation speed, which becomes lower than a gigahertz. Furthermore, two digital-analog converters should be used to obtain a 16 QAM modulation.

It therefore appears that all of the systems proposed to date are complex, whether because these systems require a control law that is relatively difficult to generate or because these systems are bulky.

BRIEF DESCRIPTION OF THE INVENTION

There is therefore a need for a modulating system making it possible to obtain a multilevel quadrature amplitude modulation that is easier to implement.

According to the invention, this aim is achieved by a modulating system capable of generating a multilevel quadrature amplitude modulation able to be represented by a constellation with $4^k$ states, k being a positive integer greater than or equal to 2, the modulating system comprising a first number of first optical channels, each of the first optical channels comprising a modulation device, and a second number of first optical channels further each including a first phase shifting unit, the first phase shifting unit being able to introduce a phase shift of $\pi$, a first number of second optical channels, each of the second optical channels being associated bijectively with one of the first optical channels, each of the second optical channels comprising the same elements as the first optical channel with which the second optical channel is associated and a second phase shifting unit, the second phase shifting unit being able to introduce a phase shift of π/2. The first number is equal to the integer k, and the second number is equal to the quotient of the Euclidean division of the integer k by the number 2.

According to specific embodiments, the system comprises one or more of the following features, considered alone or according to any technically possible combinations:

the integer k is an even number and wherein each modulating device includes an amplitude modulator only.

the integer k is an odd number and wherein the assembly of modulating devices of the system is divided into two subassemblies, each modulating device of the first subassembly being an amplitude modulator only and the modulating devices of the second assembly being part of a binary phase change modulation unit, the first subassembly including two times the second number of modulating devices and the second subassembly including two modulating devices.

the optical modulating devices belonging to the first optical channels are sequenced in a sequence that can be represented by an index varying between 1 and two times the second number, the i-th optical modulating device working between an i-th first modulation value and an i-th second modulation value, for any integer i varying between 1 and two times the second number, the i-th first modulation values $V_{1i}$ and i-th second modulation values $V_{2i}$ being defined by the following formulas:

$$V_{1i} = \frac{E}{2} + \frac{E}{2i}$$

$$V_{2i} = \frac{E}{2} - \frac{E}{2i}$$

where:
E is the field injected at the input of the i-th modulation device, and
"." designates the multiplication function.

the optical modulating devices belonging to the second optical channels are sequenced in a sequence that can be represented by an index varying between 1 and two times the second number, the i-th optical modulating device working between an i-th first modulation value and an i-th second modulation value, for any integer i varying between 1 and two times the second number, the i-th first modulation values $V_{1i}$ and i-th second modulation values $V_{2i}$ being defined by the following formulas:

$$V_{1i} = \frac{E}{2} + \frac{E}{2i}$$

$$V_{2i} = \frac{E}{2} - \frac{E}{2i}$$

where:
E is the field injected at the input of the i-th modulation device, and
"." designates the multiplication function.

each optical modulating device includes a Mach-Zehnder modulator or an electro-absorption modulator.

each optical modulating device includes a unit for generating a modulation of an optical signal, the unit comprising a first resonant ring modulator including a first waveguide having an input and an output, a first ring waveguide, called first ring, the first ring being optically coupled to the first waveguide and having a first effective index, and a first control device able to modulate the first effective index of the first ring according to a first control law. The unit also comprises a second resonant ring modulator including a second waveguide having an input, an output, the input of the second waveguide being connected to the output of the first waveguide, a second ring waveguide, called second ring, the second ring being optically coupled to the second waveguide and having a second effective index, and being independent of the first ring, and a second control device able to modulate the second effective index of the second ring according to a second control law. The modulation unit has at least one characteristic influencing the chirp introduced by the modulation unit, the characteristics of the modulation unit being chosen so as to minimize the absolute value of the chirp introduced by the modulation unit.

the modulating device includes at least two modulation units able to operate on two different wavelengths.

the integer k is equal to 2, 3 or 4.

the first resonant ring modulator has a first transfer function defined as the ratio between the optical field at the output of the first modulator and the incident optical field and has first parameters influencing the first transfer function, the second resonant ring modulator has a second transfer function defined as the ratio between the optical field at the output of the second modulator and the incident optical field and has second parameters influencing the second transfer function, the characteristics influencing the chirp introduced by the device being the first parameters and the second parameters.

the two resonant ring modulators are identical.

the first control law and the second control law are such that when the first effective index varies by a first quantity, the second effective index varies by a second quantity opposite the first quantity.

the first and second control laws respectively control the first and second ring modulators by carrier injection, the first control law being a voltage varying between $V_{BIAS}$ and $V_{BIAS}-A$, A being a positive value and $V_{BIAS}$ being a value strictly greater than A, and the second control law being a voltage varying between $V_{BIAS}$ and $V_{BIAS}+\beta*A$, β being a strictly positive value.

the first and second control laws respectively control first and second ring modulators by carrier depletion, the first control law being a voltage varying between $-V_{BIAS}$ and $-V_{BIAS}+A$, A being a positive value and $V_{BIAS}$ being a value strictly greater than A, and the second control law being a voltage varying between $-V_{BIAS}$ and $-V_{BIAS}-\beta*A$, β being a strictly positive value.

the device includes an input, an output and an intermediate waveguide, the intermediate waveguide connecting the input of the second waveguide to the output of the first waveguide.

the device includes an input, an output, the first resonant ring modulator including a third waveguide having an input and an output, the third waveguide being optically coupled to the first ring, the input of the device being the input of the third waveguide.

The invention also relates to an architecture including an optical source, a modulating system as previously described, the optical source being able to illuminate the modulating system.

BRIEF DESCRIPTION OF THE DRAWINGS

Other features and advantages of the invention will appear upon reading the following description of embodiments of the invention, solely as an example and done in reference to the drawings, which are.

DETAILED DESCRIPTION OF THE INVENTION

Below, general definitions are first provided. A summary of the invention is next given before going into an example modulating system for an integer k greater than or equal to 2. Next, the case of an even integer k is outlined, then the case of an odd integer k. Example modulation units are next described, before explaining some specific cases (k=2, k=3 and k=4).

1—General Definitions

Multilevel quadrature amplitude modulation is widely used in the field of radio data communications. Many forms of multilevel quadrature amplitude modulation exist. In particular, 16-QAM, 32-QAM, 64-QAM, 128-QAM and 256-QAM modulations are particularly interesting. The figure preceding the modulation gives the number of possible states in the multilevel quadrature amplitude modulation under consideration.

One of the major advantages of using such modulations is to increase the throughput without necessarily increasing the bandwidth of the components, since the higher the number of states is, the more bits it is possible to transport per symbol.

A constellation diagram makes it possible to show the different positions of the possible states in a QAM-type modulation. The more the order of the modulation increases, the more the number of points in the constellation diagram increases.

Figure 1:
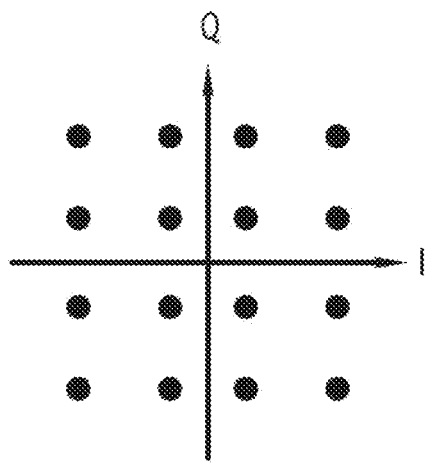
FIG. 1, a constellation diagram of a 16-QAM-type modulation.

As an example, FIG. 1 shows the constellation of a diagram for a modulation of the 16-QAM type. As expected, the graph includes sixteen separate points. It should be noted that there are four coordinates on each of the two axes I and Q for each of the states. Half of these coordinates are positive, and the other half are negative. More generally, for any $4^k$-QAM-type constellation, where k is an integer greater than or equal to 2, it is possible to show that all of the states have a first coordinate along the axis I chosen from among $2^k$ coordinates and a second coordinate along the axis Q chosen from among $2^k$ coordinates.

2—Summary of the Invention

The invention proposes a particular assembly making it possible to generate particular QAM modulations, namely modulations of the $4^k$-QAM type, where k is an integer greater than or equal to 2.

More generally, the particular setup is a modulating system able to generate an amplitude modulation of the $4^k$-QAM type, the modulating system comprising:

- a first number of first optical channels, each of the first optical channels comprising a modulating device, and a second number of first optical channels further each including a first phase shifting unit, the first phase shifting unit being capable of introducing a phase shift of π,
- a first number of second optical channels, each of the second optical channels being associated bijectively with one of the first optical channels, each of the second optical channels comprising the same elements as the first optical channel with which the second optical channel is associated and a second phase shifting unit, the second phase shifting unit being able to introduce a phase shift of π/2, the first number is equal to the integer k, and the second number is equal to the quotient of the Euclidean division of the integer k by the number 2.

The system and its operation are outlined in the rest of the description.

The system makes it possible to generate a multilevel quadrature amplitude modulation.

This generation is easier to do in particular because it can be demonstrated that the system does not involve the use of digital-analog converters.

3—Example Modulation System for Any Integer K

In this section, k is any integer having the property of being greater than or equal to two.

Figure 2:
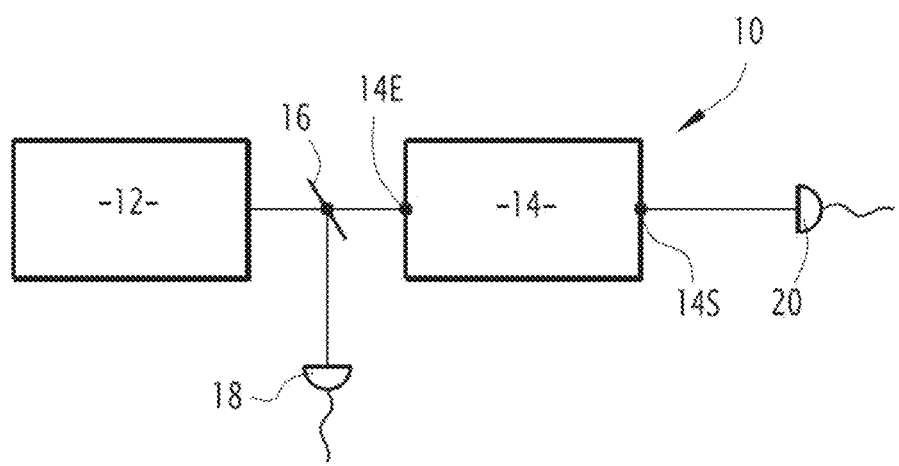
FIG. 2, a diagrammatic illustration of an example architecture comprising a modulating system able to generate a quadrature amplitude modulation able to be represented by a constellation of $4^k$ states for an integer k greater than or equal to 2.

An architecture 10 is shown in FIG. 2.

The architecture 10 includes an optical source 12 and a modulating system 14.

The optical source 12 is for example a laser source.

The optical source 12 is able to illuminate the modulating system 14 to inject an optical wave into the modulating system 14.

The modulating system 14 includes an input port 14E and an output port 14S.

As an example, each port 14E and 14S is a waveguide.

Figure 6:
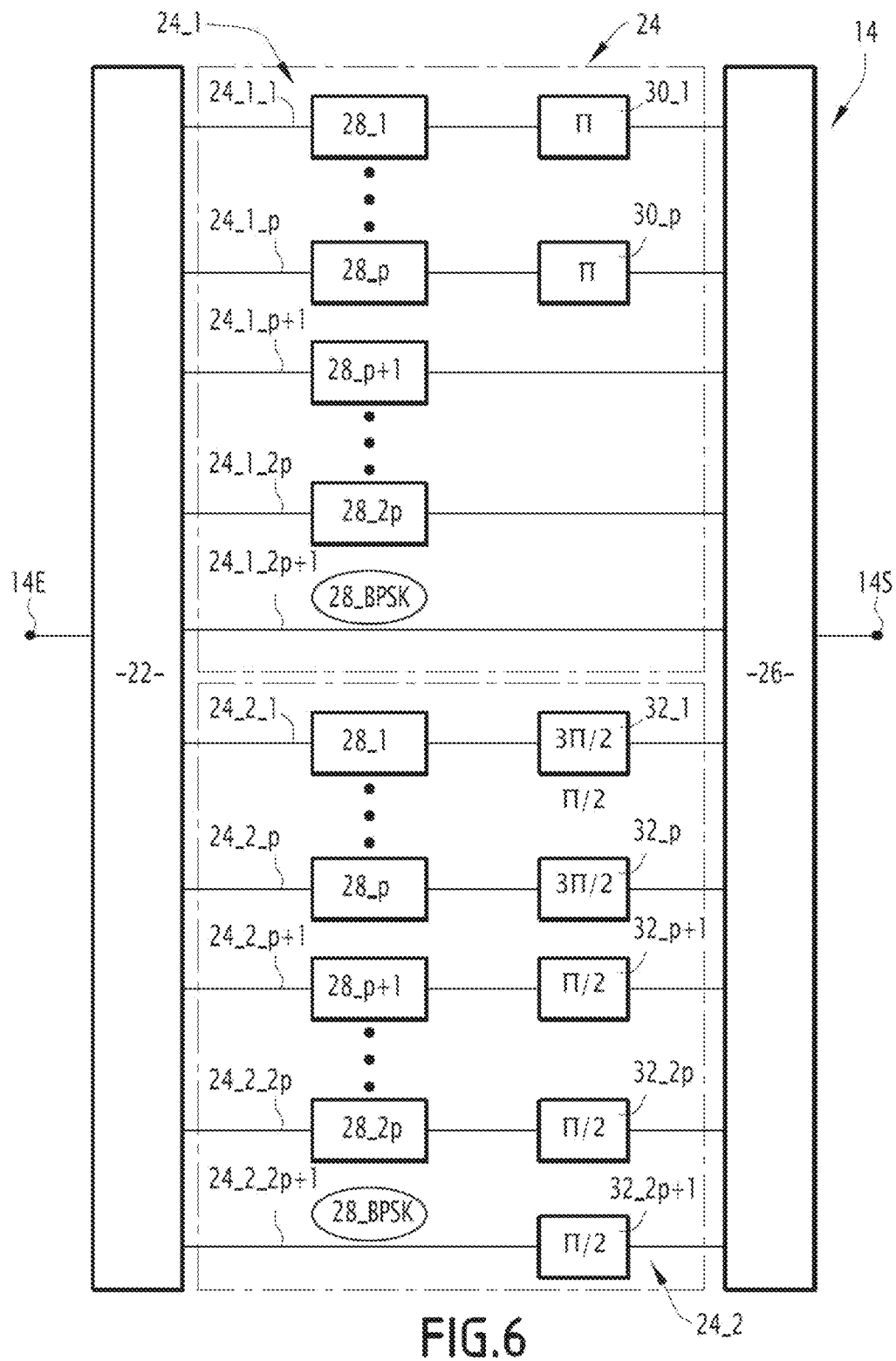
FIG. 6, a diagrammatic illustration of the example modulation system according to FIG. 2 for an odd integer k.

According to the example of FIG. 6, the optical source 12 and the input port 14E of the modulating system 14 are connected by an intermediate waveguide.

The modulating system 14 is able to generate a modulation of type $4^k$-QAM as previously defined. More specifically, the modulating system 14 is able to generate a modulation of type $4^k$-QAM on an incident wave on the input port 14E. The modulating system 14 thus makes it possible to obtain a modulated wave on the output port 14S.

In order to show such a modulation, FIG. 2 proposes a characterization setup with a beam splitter 16 and two photodiodes 18 and 20. The beam splitter 16 is inserted between the optical source 12 and the input port 14E of the modulating system 14 and makes it possible to remove part of the incident optical wave injected at the input port 14E of the modulating system 14. The first photodiode 18 collects the incident optical wave to obtain a signal. The second photodiode 20 is positioned so as to collect the output optical wave of the modulating system 14 to obtain a signal. Comparing the signals generated by the two photodiodes 18 and 20 makes it possible to show the generation of the modulation of type $4^k$-QAM.

Figure 3:
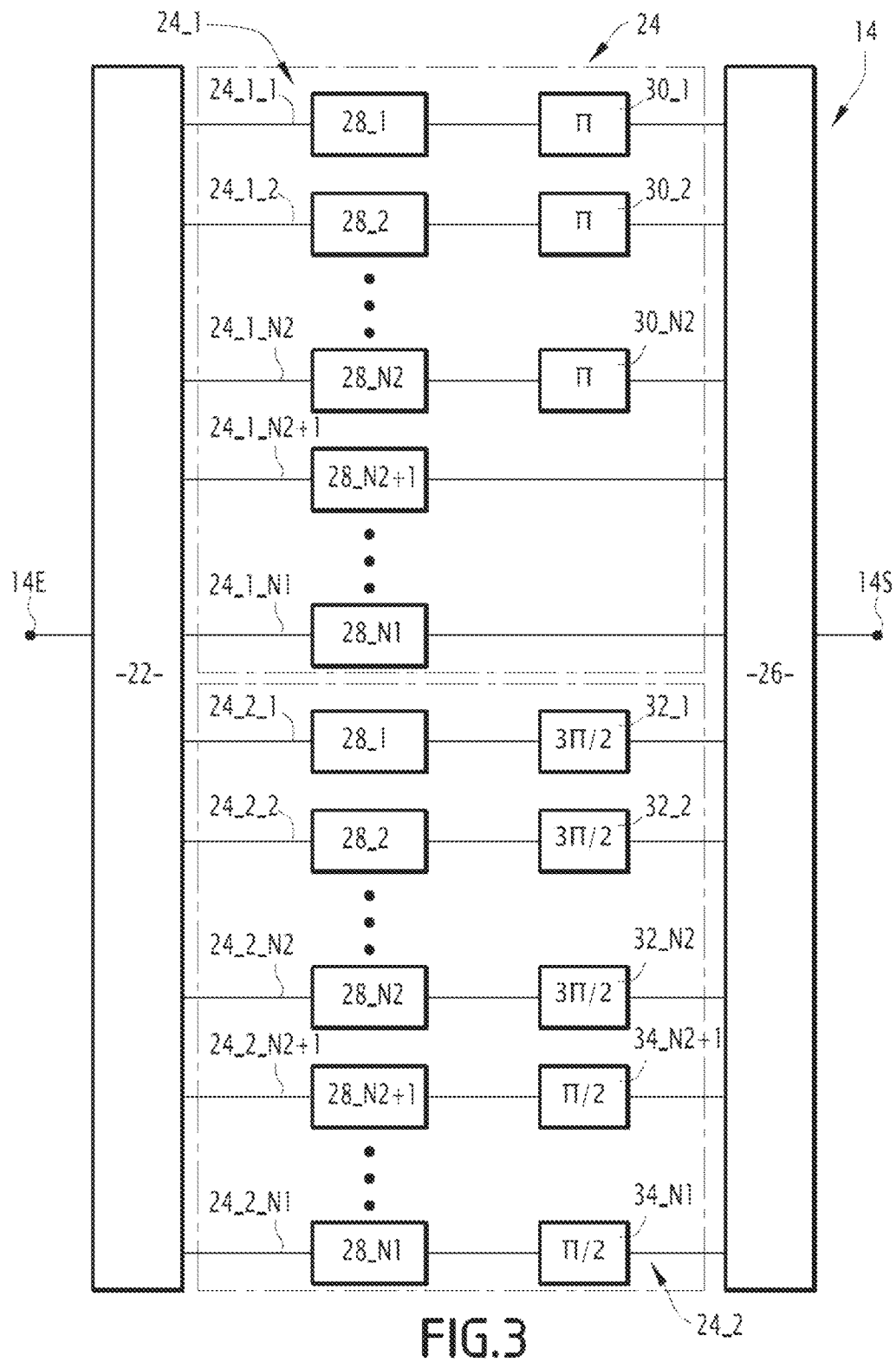
FIG. 3, a diagrammatic illustration of the example modulating system according to FIG. 2.

An example modulating system 14 is illustrated in reference to FIG. 3.

The modulating system 14 comprises an input stage 22, a set of optical modulating channels 24 and an output stage 26.

The input stage 22 is able to collect an incident optical wave on the input port 14E of the modulating system 14 and divide the incident optical wave into a plurality of incident optical waves for each of the optical modulating channels 24.

For example, the input stage 22 is an optical input channel and an optical power divider.

Each of the optical modulating channels 24 is able to modulate a respective incident optical wave to obtain a respective output optical wave.

The output stage 26 is able to recombine the output optical waves from each of the optical modulating channels 24 to obtain an optical wave at the output of the modeling system 14, i.e., an optical wave emerging at the output port 14S of the modulating system 14.

For example, the output stage 26 is an input optical channel and an optical power combiner.

In the context of FIG. 3, an optical channel is a propagation channel on which an incident wave interacts with optical elements.

In the case of FIG. 3, the different optical modulating channels 24 are parallel inasmuch as each optical wave in an optical modulating channel propagates or interacts with a corresponding optical element at the same time as the other incident waves.

The set of optical modulating channels 24 is divided into two parts, i.e., the first optical modulating channels 24_1 and the second optical modulating channels 24_2.

The set of optical modulating channels 24 includes as many first optical modulating channels 24_1 as there are second optical modulating channels 24_2. In the case at hand, the set of optical modulating channels 24 includes a first number N1 of first optical modulating channels 24_1 and a first number N1 of second optical modulating channels 24_2.

There is a link between the first number N1 and the representation of the $4^k$-QAM-type modulation in constellation form. Indeed, the first number N1 is equal to the integer k.

For convenience, each of the first optical modulating channels 24_1 is identified by a numerical index. Thus, the first optical modulating channel that is identified by index 1 is denoted 24_1_1 hereinafter; the first optical modulating channel that is identified by index 2 is denoted 24_1_2 hereinafter, and so forth, up to the first optical modulating channel identified by Index N1, which is denoted 24_1_N1. The indices will also be used to identify all of the elements belonging to a given first optical modulating channel 24_1.

In the particular case shown in FIG. 3, without this being a limitation, the integer k is assumed to be strictly greater than 5. As a result, the first number N1 is strictly greater than 5.

Each of the first optical modulating channels 24_1 includes a modulating device 28.

Each modulating device 28 is identified with the index of the first optical modulating channel 24_1 to which modulating device 28 belongs. Thus, the first modulating device 28_1 belongs to the first optical modulating channel 24_1_1 that is identified by index 1; the second modulating device 28_2 belongs to the first optical modulating channel 24_1_2 that is identified by index 2, and so forth, up to the $N1^{st}$ modulating device 28_N1, which belongs to the first optical modulating channel 24_1_N1 identified by index N1.

The nature of the modulating devices 28 is described more precisely below.

Among the first modulating channels 24_1, a second number of first modulating channels further include a phase shifting unit 30 able to introduce a phase shift of π into the phase of the incident wave. Such a phase shifting unit is simply denoted "π phase shifting unit 30" below.

The second number is denoted N2. There is a link between the second number N2 and the representation of the $4^k$-QAM-type modulation in the form of constellations. Indeed, the second number N2 is equal to the quotient of the Euclidean division of the integer k by the number 2.

Alternatively, the second number N2 is equal to the whole part of the division of the integer k by the number 2. Mathematically, this is written N2=E(k/2), where E designates the whole part mathematical function.

By definition, the whole part of a real number x is the only relative whole number n (positive, negative or zero), such that $$n \leq x < n+1$$

Thus, for example, for k=4, N2=2 and for k=7, N2=3.

To simplify, it is assumed that the first optical modulating channels 24_1 that are identified by an index comprised between 1 and the second number N2 include a π phase shifting unit 30. Thus, the first π phase shifting unit 30_1 belongs to the first optical modulating channel 24_1_1 that is identified by index 1; the second π phase shifting unit 30_2 belongs to the first optical modulating channel 24_1_2 that is identified by index 2, and so forth, up to the N2$^{nd}$ π phase shifting unit 30_N2, which belongs to the first optical modulating channel 24_1_N2 identified by index N2.

By definition, a π phase shifting unit is a unit capable of introducing a phase shift of π in the phase of an incident wave.

More generally, a phase shifting unit of X (X being a number) is a unit capable of introducing a phase shift of X into the phase of an incident wave. In other words, the phase shift between an emerging wave of such a phase shifting unit and an incident wave is equal to X.

As expected, however, all of the first optical channels whereof the index is comprised between the integer N2+1 and the integer N1 do not include a π phase shift. In particular, the first optical modulating channel 24_1_N2+1 that is identified by the index N2+1 does not include a π phase shifting unit. The same is true for the first optical modulating channel 24_1_N1 that is identified by the index N1 and also does not include a π phase shifting unit.

For convenience, each of the second optical modulating channels 24_2 is also identified by a numerical index. Thus, the second optical modulating channel that is identified by index 1 is denoted 24_2_1 hereinafter; the second optical modulating channel that is identified by index 2 is denoted 24_2_2 hereinafter, and so forth, up to the second optical modulating channel identified by Index N1, which is denoted 24_2_N1. The indices will also be used to identify all of the elements belonging to a given second optical modulating channel 24_2.

Each of the second optical modulating channels 24_2 is bijectively associated with one of the first optical modulating channels 24_1. According to the proposed bijective association, each of the second optical modulating channels 24_2 comprises the same elements as the first channel with which the second channel is associated and a phase shifting unit capable of introducing a phase shift of π/2.

In the case at hand, a second optical modulating channel 24_2 is associated with a first optical modulating channel 24_1 when each of the two optical modulating channels 24_1 and 24_2 is identified by the same index. In other words, this means that the first optical modulating channel 24_1_1 that is identified by index 1 is bijectively associated with the second optical modulating channel 24_2_1 that is identified by index 1; the first optical modulating channel 24_1_2 that is identified by index 2 is bijectively associated with the second optical modulating channel 24_2_2 that is identified by Index 2; . . . ; the first optical modulating channel 24_1_N2 that is identified by index N2 is bijectively associated with the second optical modulating channel 24_2_N2 that is identified by index N2; the first optical modulating channel 24_1_N2+1 that is identified by index N2+1 is bijectively associated with the second optical modulating channel 24_2_N2+1 that is identified by index N2+1; . . . ; the first optical modulating channel 24_1_N1 that is identified by index N1 is bijectively associated with the second optical modulating channel 24_2_N1 that is identified by index N1.

In other words, the existence of the bijective association implies that each of the second optical modulating channels 24_2 includes a modulating device 28. Each modulating device 28 is identified with the index of the second optical modulating channel 24_2 to which the modulating device 28 belongs. Since the modulating device 28 is identical for each of the first optical channels and second optical channels 24_1 and 24_2 sharing the same index, no distinction is made between the modulating device of the first optical channel and the modulating device of the second optical channel in the choice of the notation.

Thus, the first modulating device 28_1 belongs to the second optical modulating channel 24_2_1 that is identified by index 1; the second modulating device 28_2 belongs to the first optical modulating channel 24_2_2 that is identified by index 2, and so forth, up to the N1$^{st}$ modulating device 28_N1, which belongs to the first optical modulating channel 24_1_N1 identified by index N1.

The nature of the modulating devices 28 is described more precisely below.

Furthermore, a second number of modulating channels further include a phase shifting unit 32 capable of introducing a phase shift of 3π/2 into the phase of the incident wave. Such a phase shifting unit is simply denoted "3π/2 phase shifting unit 32" below.

Thus, the first 3π/2 phase shifting unit 32_1 belongs to the second optical modulating channel 24_2_1 that is identified by index 1; the second 3π/2 phase shifting unit 32_2 belongs to the second optical modulating channel 24_2_2 that is identified by index 2, and so forth, up to the N2$^{nd}$ 3π/2 phase shifting unit 32_N2 that belongs to the second optical modulating channel 24_2_N2, identified by index N2.

Furthermore, each of the other second modulating channels (like those that are identified by an index comprised between N2+1 and N1) further includes a phase shifting unit 34 capable of introducing a phase shift of π/2 into the incident wave. Such a phase shifting unit is simply denoted "π/2 phase shifting unit 34" below.

Thus, the π/2 phase shifting unit 34_N2+1 that is identified by the index N2+1 belongs to the second optical modulating channel 24_2_N2+1 that is identified by the index N2+1, and so forth, up to the N1$^{st}$ π/2 phase shifting unit 34_N1, which belongs to the second optical modulating channel 24_2_N1, identified by index N1.

The operation of the system 14 depends on the parity of the integer k. This will be described more precisely below.

It can be demonstrated that the system 14 according to FIG. 3 makes it possible to generate a M-QAM modulation where M is equal to $4^k$.

Furthermore, the system 14 makes it possible to obtain such an effect without using digital-analog converters.

Figure 4:
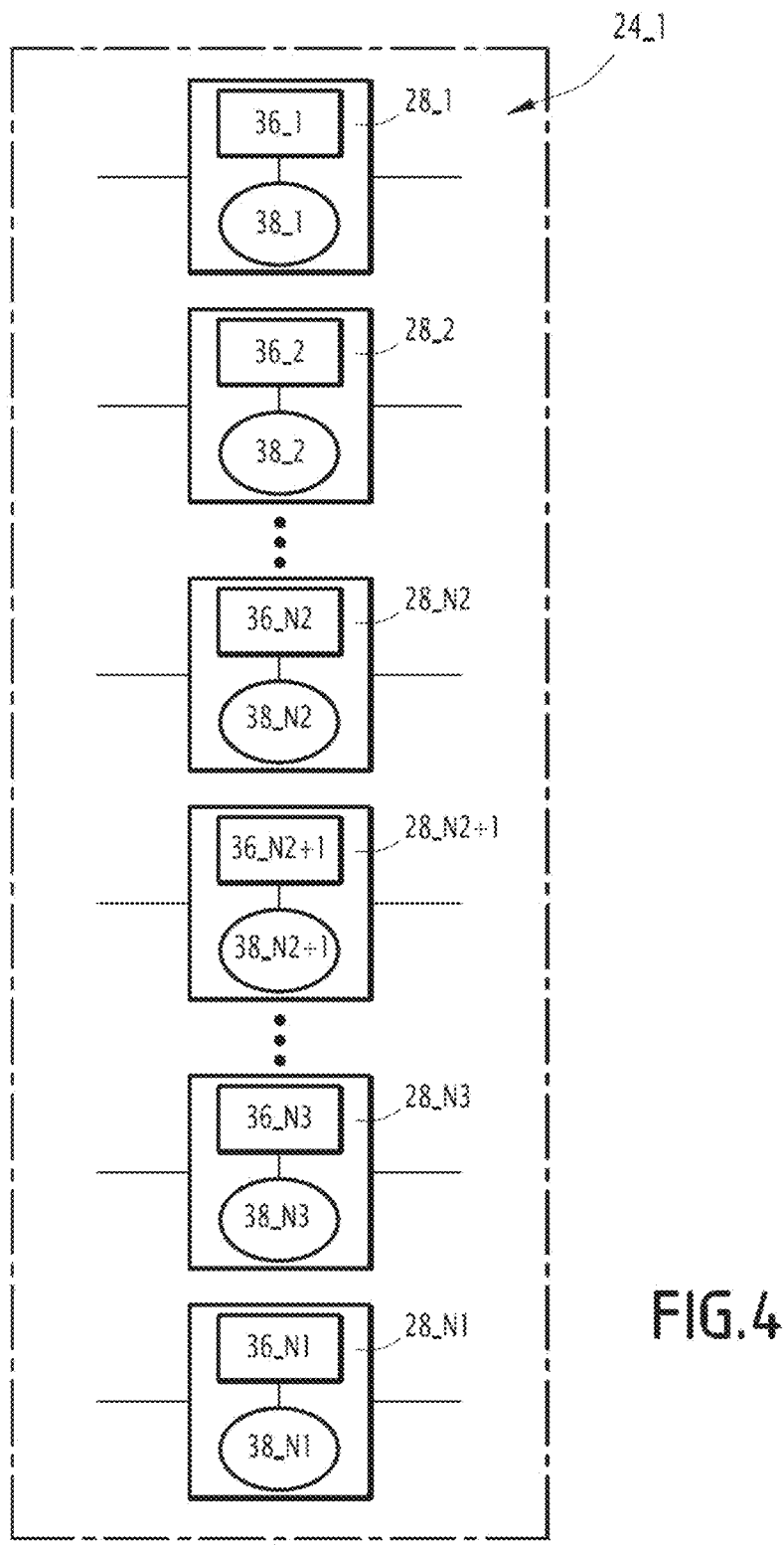
FIG. 4, a diagrammatic illustration of an example set of modulating devices belonging to the modulating system of FIG. 2.

According to one embodiment, each modulating device 28 is as illustrated diagrammatically in reference to FIG. 4.

To simplify, only the modulating devices 28 of the first optical channels 24_1 are shown in FIG. 4, knowing that the same remarks apply for the modulating devices 28 of the second optical channels 24_2.

Each modulating device 28 includes a modulating unit 36 and a control unit 38 to control the modulating unit 36.

As before, each modulating unit 36 and each control unit 38 are identified by the index of the first optical channel 24_1 with which these units 36 and 38 are associated. Thus, the first modulating device 28_1 includes a first modulating unit 36_1 and a first control unit 38_1; the second modulating device 28_2 includes a second modulating unit 36_2 and a second control unit 38_2; . . . ; the N2$^{nd}$ modulating device 28_N2 includes a N2$^{nd}$ modulating unit 36_N2 and a N2$^{nd}$ control unit 38_N2; the N2+1$^{st}$ modulating device 28_1 includes a N2+1$^{st}$ modulating unit 36_N2+1 and a N2+1$^{st}$ control unit 38_N2+1; . . . ; the N1' modulating device 28_N1 includes a N1' modulating unit 36_N1 and a N1' control unit 38_N1.

An i-$^{th}$ control unit 38_i is considered, i being an integer comprised between 1 and a third number N3. The third number N3 is double the second number N2.

It should be noted, for the next part, that there is a link between the third number N3 and the representation of the 4$^k$-QAM-type modulation in the form of constellations. Indeed, the third number N3 is equal to the product of 2 times the quotient of the Euclidean division of the integer k by the number 2.

The i$^{th}$ control unit 38_i is capable of controlling the i$^{th}$ modulating unit 36_i so that the i$^{th}$ modulating unit 36_i operates between a i$^{th}$ first modulating value $V_{i1}$ and a i$^{th}$ second modulating value $V_{i2}$. For the rest of the description, the i$^{th}$ first modulating value $V_{i1}$ is called i$^{th}$ value one $V_{i1}$, while the i$^{th}$ second modulating value $V_{i2}$ is called i$^{th}$ value two $V_{i2}$.

The i$^{th}$ value one $V_{i1}$ and the i$^{th}$ value two $V_{i2}$ are defined by the following formulas for i varying between 1 and the second number $N_2$:

$$V_{i1} = \frac{E}{2} + \frac{E}{2^i}$$

$$V_{i2} = \frac{E}{2} - \frac{E}{2^i}$$

Where:
E is the field injected at the input of the i-th modulating unit 38_i, and
"." designates the mathematical multiplication operation.

As an illustration, these formulas can be explained for the modulating devices 28 that have been illustrated.

Thus, for the first modulating device 28_1, the first modulating unit 36_1 is capable of operating between the first value one $V_{11}$ and the first value two $V_{12}$, these two values being equal to:

$$V_{11} = \frac{E}{2} + \frac{E}{2^1} = \frac{E}{2} + \frac{E}{2} = E$$

$$V_{12} = \frac{E}{2} - \frac{E}{2^1} = \frac{E}{2} - \frac{E}{2} = 0$$

For the second modulating device 28_2, the second modulating unit 36_2 is capable of operating between the second value one $V_{21}$ and the second value two $V_{22}$, these two values being equal to:

$$V_{21} = \frac{E}{2} + \frac{E}{2^2} = \frac{E}{2} + \frac{E}{4} = \frac{3E}{4}$$

$$V_{22} = \frac{E}{2} - \frac{E}{2^2} = \frac{E}{2} - \frac{E}{4} = \frac{E}{4}$$

For the N2$^{nd}$ modulating device 28_N2, the N2$^{nd}$ modulating unit 36_N2 is capable of operating between the N2$^{nd}$ value one $V_{N21}$ and the N2$^{nd}$ value two $V_{N22}$, these two values being equal to:

$$V_{N21} = \frac{E}{2} + \frac{E}{2^{N2}}$$

$$V_{N22} = \frac{E}{2} - \frac{E}{2^{N2}}$$

Such a system 14 makes it possible to still further simplify the generation of the desired modulation, since the control laws of each modulating unit 38 are easy to implement.

4—CASE OF AN EVEN INTEGER K

In this section, k is any even integer having the property of being greater than or equal to two. As a result, the integer k is written in the form k=2*ρ, where ρ is an integer greater than or equal to one.

It should be noted that, in the case where k is an even integer, all of the modulating devices 28 are preferably amplitude modulators only. Examples of amplitude modulators are outlined in reference to section 6.

Hereinafter, three alternative approaches for presenting the modulating system 14 for an even integer k are proposed. The three approaches make it possible to better understand the operation of the modulating system 14 in this particular case.

4.1—First Approach

Figure 5:
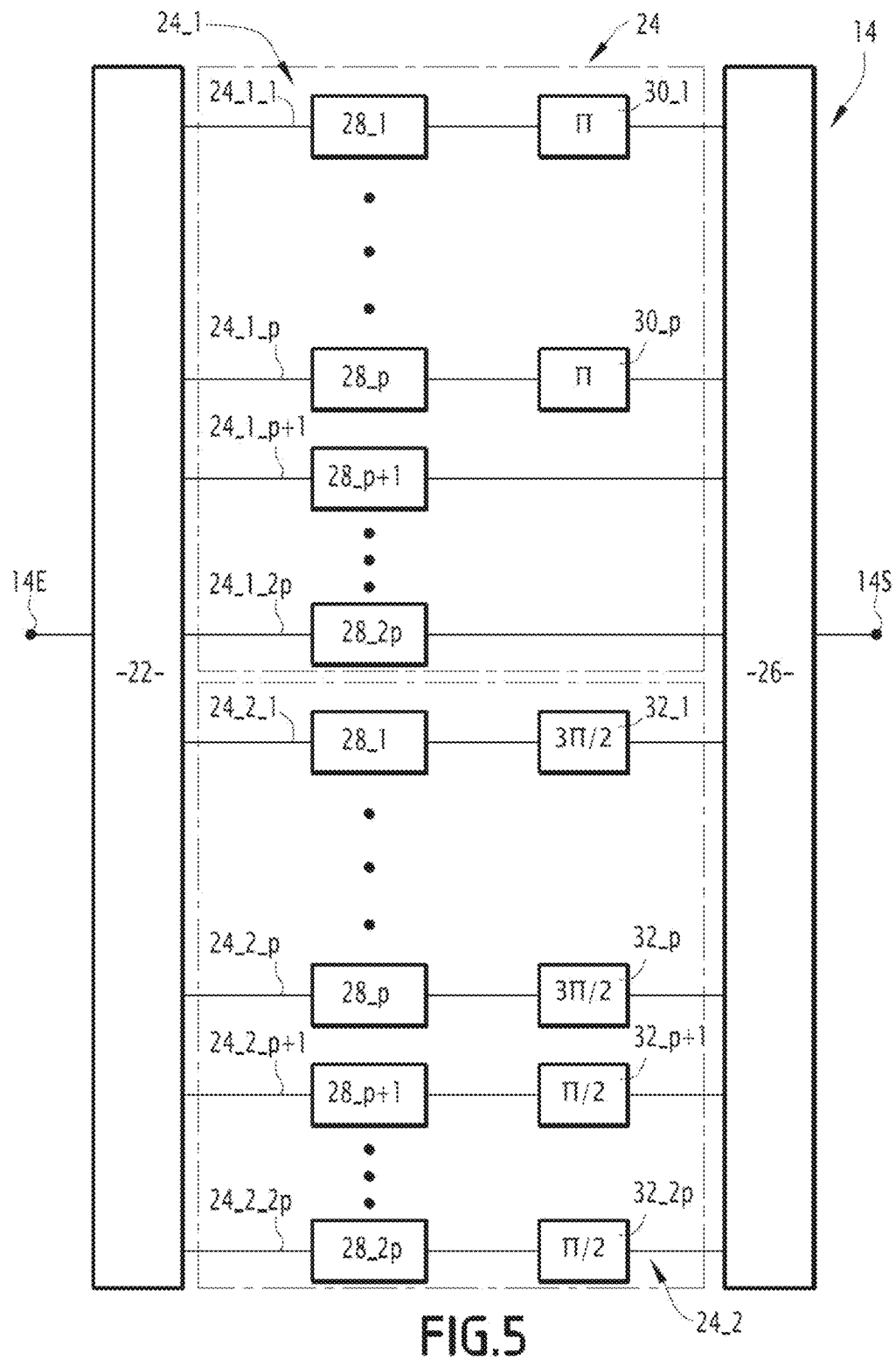
FIG. 5, a diagrammatic illustration of the example modulating system according to FIG. 2 for an even integer k.

According to the first approach, the presentation of the previous paragraph is used relative to any integer k in reference to FIG. 5.

The same remarks as for the case of any integer k apply, by replacing the first integer N1 and the second integer N2 with their respective values. In the case at hand, the first integer N1 is equal to 2*p, while the second integer N2 is equal to p.

The operation of the modulating system 14 will now be described.

The same remarks as for the case of any integer k apply.

Furthermore, the third integer N3 is in this particular case equal to 2*p, i.e., equal to the first integer N1.

This means that, in this particular case, all of the i$^{th}$ control units 38_i are capable of controlling the i$^{th}$ modulating unit 38_i so that the i$^{th}$ modulating unit 36_i operates between the i$^{th}$ value one $V_{i1}$ and the i$^{th}$ value two $V_{i2}$.

Furthermore, it should be noted that for the N2$^{nd}$ modulating device 28_N2, the N2$^{nd}$ modulating unit 36_N2 is capable of operating between the N2$^{nd}$ value one $V_{N21}$ and the N2$^{nd}$ value two $V_{N22}$, these two values being equal to:

$$V_{N21} = \frac{E}{2} + \frac{E}{2^p}$$

$$V_{N22} = \frac{E}{2} - \frac{E}{2^p}$$

Furthermore, it is also remarkable that, for the N1$^{st}$ modulating device 28_N1, the N1$^{st}$ modulating unit 36_N1 is capable of operating between the N1$^{st}$ value one $V_{N11}$ and the N1$^{st}$ value two $V_{N12}$, these two values being equal to:

$$V_{N11} = \frac{E}{2} + \frac{E}{2^{2p}} = \frac{E}{2} + \frac{E}{2^{2p}}$$

-continued $$V_{N12} = \frac{E}{2} - \frac{E}{2^{2p}} = \frac{E}{2} - \frac{E}{2^{2p}}$$

By addition and subtraction, for each of the first optical channels 24_1, $2^P$ distinct values can be generated. By symmetry, for each of the second optical channels 24_2, $2^P$ distinct values can be generated.

Furthermore, each of the first optical channels 24_1 is phase shifted by π/2 relative to the second optical channel 24_2 associated by the bijection. If the first optical channels 24_1 are used to generate the real component I, the second optical channels 24_2 are used to generate the imaginary component Q.

Thus, a modulation is generated whereof the constellation includes $2^P*2^P=4^{2*P}=4^k$ states, i.e., a modulation of the $4^k$-QAM type.

Such a modulation system 14 therefore has the same advantages as above.

4.2—Second Approach

According to the second approach, it will be noted, as shown in FIG. 5, that instead of distributing all of the optical modulating channels in two subassemblies as for the first approach, it is possible to distribute all of the optical modulating channels in four subassemblies: a first subassembly, a second subassembly, a third subassembly and a fourth subassembly.

Each subassembly includes p optical modulating channels.

Each of the optical channels of the first subassembly includes a modulating device and a π/2 phase shifting unit. Each of the optical channels of the second subassembly includes a modulating device and a π phase shifting unit. Each of the optical channels of the third subassembly includes a modulating device and a 3π/2 phase shifting unit. Each of the optical channels of the fourth subassembly includes a modulating device.

Alternatively, the states of the different subassemblies may also be described as follows.

Each of the optical modulating channels of the assembly includes a modulating device. Each of the optical channels of the first subassembly further includes a π/2 phase shifting unit. Each of the optical channels of the second subassembly further includes a π phase shifting unit. Each of the optical channels of the third subassembly further includes a 3π/2 phase shifting unit.

The operation and advantages are the same as above.

4.3—Third Approach

According to the third approach, it will be noted, as shown in FIG. 5, that instead of distributing all of the optical modulating channels in two subassemblies as for the first approach, it is possible to distribute all of the optical modulating channels in p subassemblies.

Each subassembly includes four optical modulating channels. The first optical modulating channel comprises a modulating device. The second optical modulating channel comprises a modulating device and a π/2 phase shifting unit. The third optical modulating channel comprises a modulating device and a π phase shifting unit. The fourth optical modulating channel comprises a modulating device and a 3π/2 phase shifting unit.

The operation and advantages are the same as above.

5—Case of an Odd Integer K

In this section, k is any odd integer having the property of being greater than or equal to two. As a result, the integer k is written in the form k=2*p+1, where p is an integer greater than or equal to one.

In this case, all of the modulating devices 28 having an index comprised between 1 and 2*p are preferably amplitude modulators only and the modulating device 28_BPSK is a ring of the BPSK (Binary Phase-Shift Keying) type. Examples of amplitude modulators are outlined in reference to section 6.

Hereinafter, three alternative approaches for presenting the modulating system 14 for an odd integer k are proposed. The three approaches make it possible to better understand the operation of the modulating system 14 in this particular case.

5.1—First Approach

According to the first approach, the presentation of the previous paragraph is used relative to any integer k in reference to FIG. 6.

The same remarks as for the case of any integer k apply, by replacing the first integer N1 and the second integer N2 with their respective values. In the case at hand, the first integer N1 is equal to 2*r+1, while the second integer N2 is equal to r.

The operation of the modulating system 14 will now be described.

The same remarks as for the case of any integer k apply.

Furthermore, the third integer N3 is in this particular case equal to 2*r.

This means that, in this particular case, all of the $i^{th}$ control units 38_i are capable of controlling the $i^{th}$ modulating unit 38_i so that the $i^{th}$ modulating unit 36_i operates between the $i^{th}$ value one $V_{i1}$ and the $i^{th}$ value two $V_{i2}$.

Furthermore, it should be noted that for the $N2^{nd}$ modulating device 28_N2, the $N2^{nd}$ modulating unit 36_N2 is capable of operating between the $N2^{nd}$ value one $V_{N21}$ and the $N2^{nd}$ value two $V_{N22}$, these two values being equal to:

$$V_{N21} = \frac{E}{2} + \frac{E}{2^p}$$

$$V_{N22} = \frac{E}{2} - \frac{E}{2^p}$$

Furthermore, it is also remarkable that, for the $N1-1^{st}$ modulating device 28_N1-1, the $N1-1^{st}$ modulating unit 36_N1-1 is capable of operating between the $N1-1^{st}$ value one $V_{N11}$ and the $N1-1^{st}$ value two $V_{N12}$, these two values being equal to:

$$V_{N1-11} = \frac{E}{2} + \frac{E}{2^{2p}} = \frac{E}{2} + \frac{E}{2^{2p}}$$

$$V_{N1-12} = \frac{E}{2} - \frac{E}{2^{2p}} = \frac{E}{2} - \frac{E}{2^{2p}}$$

By addition and subtraction, for each of the first optical channels 24_1, $2^P$ distinct values can be generated. By symmetry, for each of the second optical channels 24_2, $2^P$ distinct values can be generated.

Furthermore, the combination of the N1$^{st}$ modulating device 28_BPSK of the first optical channel 24_1_N1 at which the index is N1 and the N1$^{st}$ modulating device 28_BPSK of the second optical channel 24_1_N1 at which the index is N1 with the N1$^{st}$ π/2 phase shifting unit forms a binary phase-shift keying unit. This makes it possible to generate four different values, i.e., E, −E, j.E and j.E where j designates the complex number for the rest of the description.

Furthermore, each of the first optical channels 24_1 is a binary phase-shift keying unit phase shifted by π/2 relative to the second optical channel 24_2 associated by the bijection. If the first optical channels 24_1 are used to generate the real component I, the second optical channels 24_2 are used to generate the imaginary component Q.

Thus, a modulation is generated whereof the constellation includes $2^p * 2^P = 4^{2*p+1} = 4^k$ states, i.e., a modulation of the $4^k$-QAM type.

Such a modulation system 14 has the same advantages as above.

5.2—Second Approach

According to the second approach, it will be noted, as shown in FIG. 6, that instead of distributing all of the optical modulating channels in two subassemblies as for the first approach, it is possible to distribute all of the optical modulating channels in four subassemblies: a first subassembly, a second subassembly, a third subassembly and a fourth subassembly.

Each of the optical channels of the first subassembly includes a modulating device and a π/2 phase shifting unit. Each of the optical channels of the second subassembly includes a modulating device and a π phase shifting unit. Each of the optical channels of the third subassembly includes a modulating device and a 3π/2 phase shifting unit. Each of the optical channels of the fourth subassembly includes a modulating device.

The first subassembly and the fourth subassembly include p+1 optical modulating channels, while the second subassembly and third subassembly comprise p optical modulating channels.

Alternatively, the elements of the different subassemblies may also be described as follows.

Each of the optical modulating channels of the assembly includes a modulating device. Each of the optical channels of the first subassembly further includes a π/2 phase shifting unit. Each of the optical channels of the second subassembly further includes a π phase shifting unit. Each of the optical channels of the third subassembly further includes a 3π/2 phase shifting unit.

The operation and advantages are the same as above.

5.3—Third Approach

According to the third approach, it will be noted, as shown in FIG. 6, that instead of distributing all of the optical modulating channels in two subassemblies as for the first approach, it is possible to distribute all of the optical modulating channels in p subassemblies and a binary phase-shift keying unit.

Each subassembly includes four optical modulating channels. The first optical modulating channel comprises a modulating device. The second optical modulating channel comprises a modulating device and a π/2 phase shifting unit. The third optical modulating channel comprises a modulating device and a π phase shifting unit. The fourth optical modulating channel comprises a modulating device and a 3π/2 phase shifting unit.

The operation and advantages are the same as above.

6—Nature of the Modulating Device

Different types of modulating units usable in the context of the invention are developed below.

6.1—Generality on a Pure Modulating Amplitude Unit

It is understood, in the frame of this invention, that a modulating unit is a pure modulating amplitude unit or only in amplitude if the modulating unit is adapted to modulate only the amplitude. This means that the modulating unit does not modulate, or least very little, the phase. This last property is quantifiable by the chirp which is defined later.

As an example, it can be used any known means as an electroabsorbing modulator (EAM), a Mach-Zehnder modulator or an appropriate ring resonator.

6.2—A Specific Example of a Pure Modulating Amplitude Unit

A specific example is first described and an annex on the resonant ring modulator is detailed

6.2.1—Description of the Specific Example

According to the invention, it is proposed to use an arrangement of resonant ring modulators having a zero chirp.

When a modulation device is used to perform an intensity modulation of an input optical signal, the output optical signal obtained is generally also phase modulated, which is not desired. By definition, the chirp parameter denoted as α is reflective of the existence of this undesirable phase modulation over the output signal. A possible mathematical definition of the chirp parameter α is as follows:

$$\alpha = 2I(t) \cdot \frac{\frac{d\phi(t)}{dt}}{\frac{dI(t)}{dt}}$$

where:
I(t) is the instantaneous intensity of the optical field measured at an output of the modulation device considered, and
φ(t) is the instantaneous phase of the optical field measured at an output of the modulation device considered.

In the monograph by Mr Seimetz which is entitled "High-Order Modulation for Optical Fiber Transmission" that was published by Springer in 2009, it is shown how to generate optical signals following a complex modulation. Such a complex modulation is referred to as "I-Q modulation" (I is the "in-phase" component, and Q the quadrature component). The generation of optical signals following a complex modulation involves the use of several modulation devices having a zero chirp parameter α.

Figure 7:
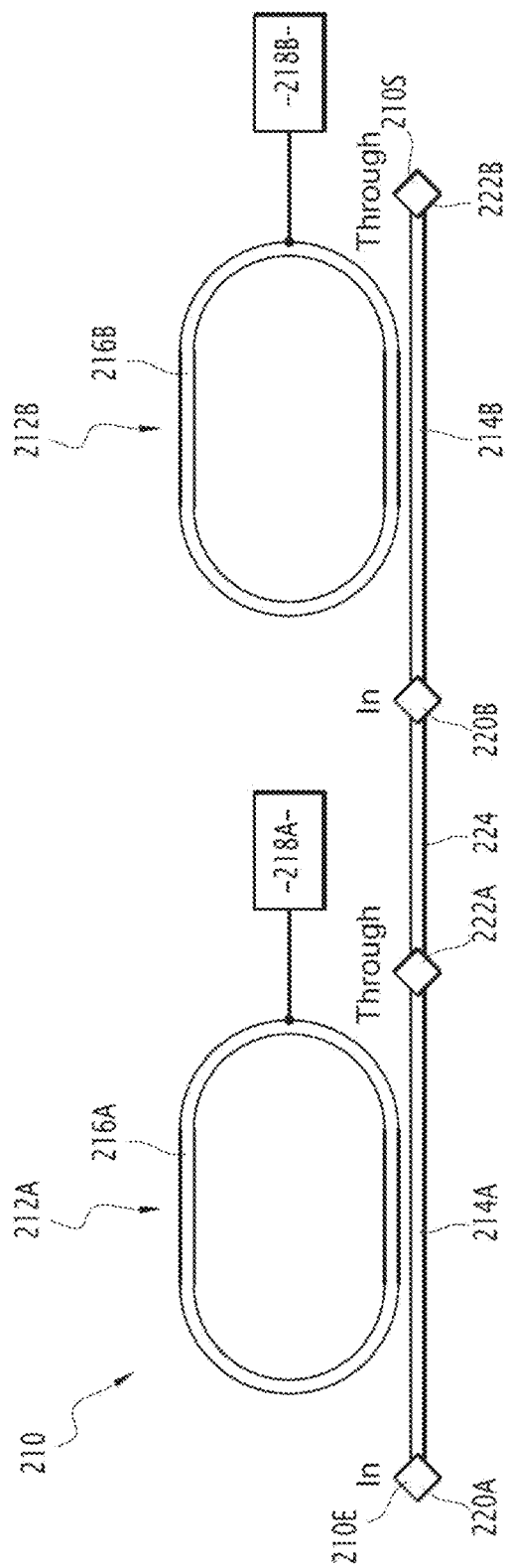
FIG. 7, a diagrammatic view of an optical modulation unit according to a first example.

A device for generating a modulation of an optical signal 210 is presented in FIG. 7. In the following sections, the device for generating a modulation 10 shall simply be referred to as modulation device 210.

The modulation device 210 comprises an input 210S and an output 210E. It is desirable for the modulation device 210 to present an absolute value of the chirp introduced by the modulation device 210 for an incident optical signal that is minimal.

In a general sense, the term "input" shall be understood in the description to refer to a port through which a luminous flux enters into the element considered. In a corresponding manner, the term "output", shall be understood in the description to refer to a port through which a luminous flux exits out of the element considered.

Applied to the case of the input 210E and the output 210S of the modulation device 210 this signifies that the input 210E of the modulation device 210 is a port through which a luminous flux enters into the modulation device 210 and that the output 210S of the modulation device 210 is a port through which the luminous flux modulated by the modulation device 210 exits the device. In effect the modulation device 210 is capable of generating a modulation of an optical signal introduced at the input 210E.

Expressed in other words, the modulation device 210 is thus part of a modulation system. The modulation system comprises a light source and the modulation device 210, with the light source being connected to the input 210E of the modulation device 210 in a manner so as to inject during operation a luminous flux into the modulation device 210.

By way of an example, the light source is a laser source and a waveguide connects the output of the light source to the input 210E of the modulation device 210.

In order to obtain a zero-chirp, an arrangement is proposed comprising of two rings in a push-pull configuration so as to eliminate the chirp. The chirp is eliminated since the electrical signal is complementary between the two rings, thus the chirp that is introduced to the first ring is offset at the second ring. This principle is described in more precise detail in the description that follows.

The modulation device 210 comprises a first ring resonator modulator 212A and a second ring resonator modulator 212B.

The elements of a ring resonator modulator are described in detail in the annex that describes the FIGS. 15 to 19. Only a portion of these elements are comprised here, it being assumed that the definitions of these elements are known thanks to the aforementioned annex.

The first modulator 212A comprises a first waveguide 214A, a first ring waveguide 16A, referred to as the first ring 216A and a first control device 218A.

The first waveguide 214A has an input 220A and an output 222A.

The first waveguide 214A may be of any shape.

In the case of FIG. 7, by way of an example, the input 220A is the In port and the output 22A is the Through port.

The first ring 216A is optically coupled to the first waveguide 214A.

The first ring 216A has a first effective index Neff1.

The first control device 218A is capable of modulating the first effective index Neff1 of the first ring 216A in accordance with a first control law L1.

In a similar manner, the second modulator 212B comprises a second waveguide 214B, a second ring waveguide 216B, referred to as the second ring 216B and a second control device 218B.

The second waveguide 214B has properties that are similar to the properties described for the first waveguide 14A. In particular, the second waveguide 214B has an input 220B and an output 222B.

The input 220B of the second waveguide 214B is connected to the output 222A of the first waveguide 214A. Such a property allows for the signal at the output of the optical modulation device 210 to be influenced by both the first ring 216A and the second ring 216B.

Several configurations are possible for connecting the input 220B of the second waveguide 214B to the output 222A of the first waveguide 214A.

In the case of FIG. 7, by way of example, the input 220B of the second waveguide 214B is the In port of the second modulator 212B and the output 222B of the second waveguide 214B is the Through port of the second modulator 212B. The modulation device 210 comprises an intermediate waveguide 224. The intermediate waveguide 224 connects the In port 220B of the second waveguide 214B to the Through the port 222A of the first waveguide 214A. In this configuration, the input 210E of the modulation device 210 is the In port 220A of the first modulator 212A and the output 210S of the modulation device 210 is the Through port 222B of the second modulator 212B.

Figure 12:
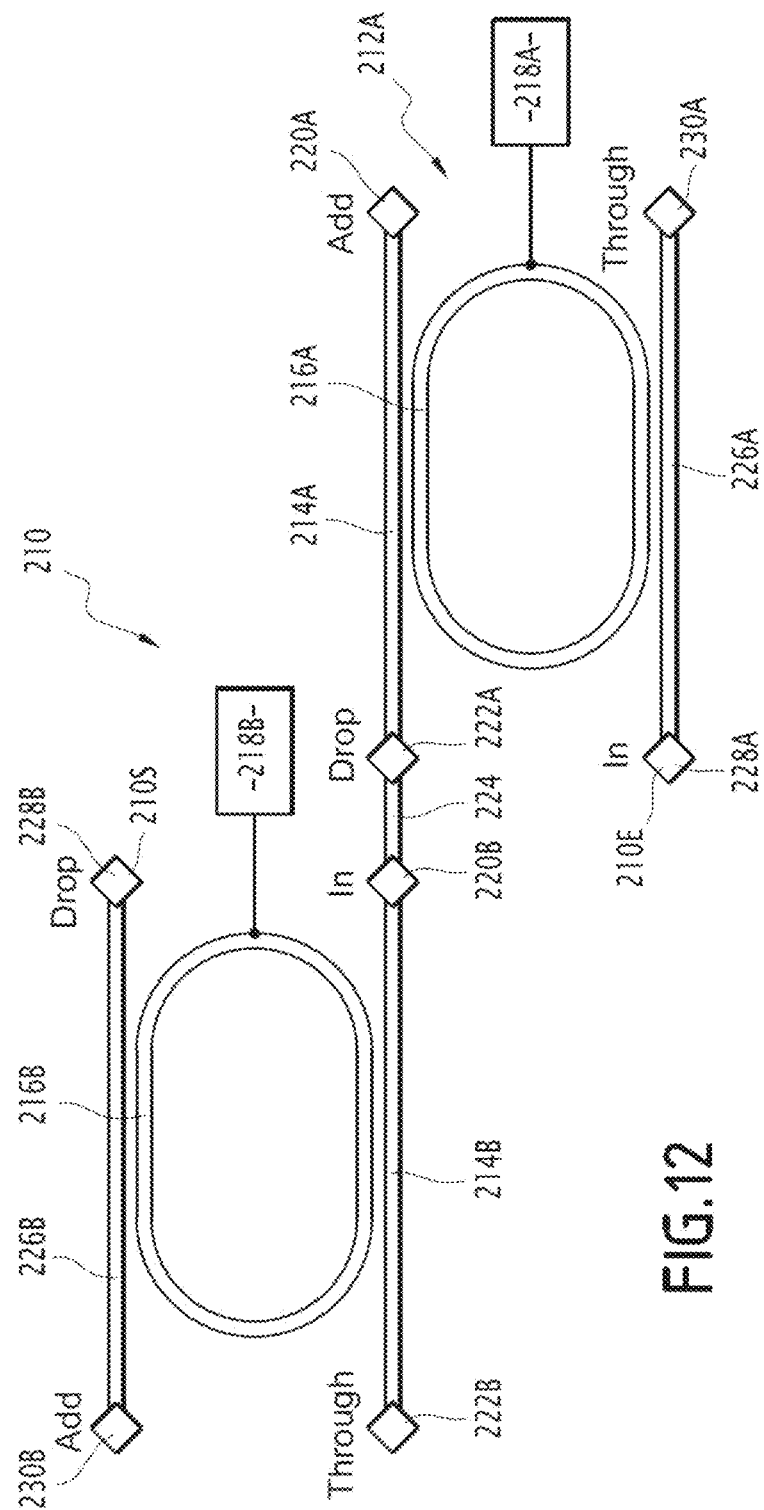
FIG. 12, a diagrammatic view of a modulation unit according to a second example.

According to a second configuration illustrated by the FIG. 12, each modulator 212A, 212B comprises two waveguides each one optically coupled to their ring 216A, 216B respectively. Thus, the first ring resonator modulator 212A comprises the first waveguide 214A which extends between the Add port 220A and the Drop port 222A and the third waveguide 226A which extends between the In port 228A and the Through port 230A. Similarly, the second ring resonator modulator 212B comprises the second waveguide 214B which extends between the In port 220B and the Through port 222B and the fourth waveguide 226B which extends between the Drop port 228B and the Add port 230B. The modulation device 210 also comprises an intermediate waveguide 224 connecting the Drop port 222A of the first modulator 212A to the In port 220B of the second modulator 214B. In this second configuration, the input 210E of the modulation device 210 is In port 228A of the first modulator 212A and the output 210S of the modulation device 210 is the Drop port 228B of the second modulator 212B.

According to a third configuration not shown, the first waveguide 214A and the second waveguide 214B are combined. In this third configuration, the input 210E of the modulation device 210 is both the In port of the first modulator 212A as well as the In port of the second modulator 212B while the output 210S of the modulation device 210 is both the Through port of the first modulator 212A as well as the Through port of the second modulator 212B.

In all the three configurations, each time, the input 220B of the second waveguide 214B is connected to the output 222A of the first waveguide 214A.

In addition, the input 210E of the modulation device 210 is the input of the first waveguide 214. This signifies that the light source of the modulation system previously mentioned above is connected to the input of the first waveguide 214.

The second ring 216B has properties that are similar to the properties described for the first ring 216A. Notably, the second ring 216B has a second effective index Neff2.

The second ring 216B is independent from the first ring 216A.

By definition, two rings are independent if the effective index of one of the two rings may be varied independently of the effective index of the other ring.

For example, the two outer zones of the rings are in electrical contact, this contact corresponding to the electrical ground while the two inner zones of the rings are not in electrical contact. The voltage applied to the inner zone of the first ring is independent of the voltage applied to the inner zone of the second ring.

The second control device 218B has properties that are similar to the properties described for the first control device 218A. In particular, the second control device 18B is capable of modulating the second effective index Neff2 of the second ring 16B in accordance with a second control law L2.

The modulation device 210 has at least one characteristic influencing the chirp introduced by the modulation device 210 for an incident optical signal. The characteristic or the characteristics features of the modulation device 210 are then chosen so as to minimise the absolute value of the chirp introduced by the modulation device 210 for an incident optical signal.

By way of an example, with reference to the annex, the characteristic or characteristics are selected from among the following characteristics:

The distance between the first ring 216A and the first waveguide 214A of the first modulator 212A,
the distance between the second ring 16B and the second waveguide 214B of the second modulator 212B,
the radius of curvature of the first ring 216A of the first modulator 212A,
the radius of curvature of the second ring 216B of the second modulator 212B,
the length of interaction between the first ring 216A and the first waveguide 214A of the first modulator 212A,
the length of interaction between the second ring 216B and the second waveguide 214B of the second modulator 212B,
the first control law L1,
the second control law L2,
the parameter of coupling between the first ring 216A and the first waveguide 214A of the first modulator 212A, and
the parameter of coupling between the second ring 216B and the second waveguide 214B of the second modulator 212B.

According to a variant embodiment, the first ring resonator modulator 212A has a first transfer function T1 defined as the ratio between the optical field (that is to say, the electrical field associated with a light wave) at the output of the first modulator 212A and the incident optical field and presents the first parameters influencing the first transfer function T1. As explained in reference to the annex, the first parameters are, for example, the distance between the first ring 216A and the first waveguide 214A of the first modulator 212A, the radius of curvature of the first ring 216A of the first modulator 212A, the length of interaction between the first ring 216A and the first waveguide 214A of the first modulator 212A, and the first control law L1. In an alternative manner, the first parameters are, for example, the parameter of coupling between the first ring 216A and the first waveguide 214A of the first modulator 212A, and the first control law L1. In this variant embodiment, the characteristic or characteristics influencing the chirp introduced by the modulation device 210 are the first parameters.

According to another variant embodiment, the second ring resonator modulator 212B has a second transfer function T2 defined as the ratio between the optical field at the output of the second modulator 212B and the incident optical field and presents the second parameters influencing the second transfer function T2. As explained with reference to the annex, the second parameters are, for example, the distance between the second ring 216B and the second waveguide 214B of the second modulator 212B, the radius of curvature of the second ring 216B of the second modulator 212B, the radius of curvature of the second ring 216B of the second modulator 212B, the length of interaction between the second ring 216B and the second waveguide 214B of the second modulator 212B, and the second control law L2. In an alternative manner, the first parameters are, for example, the parameter of coupling between the second ring 216B and the second waveguide 214B of the second modulator 212B, and the second control law L2. In this variant embodiment, the characteristic or characteristics influencing the chirp introduced by the modulation device 210 are the second parameters.

According to yet another variant embodiment, the characteristic or characteristics influencing the chirp introduced by the modulation device 210 are the first parameters and the second parameters or are selected from amongst the first parameters and the second parameters.

Preferably, according to a variant embodiment, the two modulators 212A, 212B are identical. The term "identical" modulator in the context of this invention is understood to refer to the modulators 212A and 212B having coupling parameters that are identical.

Such modulators 212A, 212B are generally modulators whose geometrical parameters are identical. This makes the manufacture of these modulators easier since it is easier to produce two modulators with the same dimensions than to produce two different rings wherein it is desired to space the resonant length by a desired fixed value.

In this variant embodiment, the characteristic or characteristics are the parameter or parameters characterising the first control law L1 and the second control law L2.

The first control law L1 and the second control law L2 are such that when the first effective index Neff1 varies by a first quantity $\Delta$Neff1, the second effective index Neff2 varies by a second quantity $\Delta$Neff2 of equivalent magnitude but with the opposite sign relative to the first quantity $-\Delta$Neff1.

Mathematically, this translates into the equivalence equation $\Delta$Neff2=$-\Delta$Neff1.

As a result thereof, the first control law L1 and the second control law L2 are such that the sum of the first effective index Neff1 and the second effective index Neff2 is constant over time.

By way of example, the control laws L1 and L2 are two modulation voltages that reproduce the sequence of bits to be transmitted in phase opposition. For this reason, the two modulators 212A and 212B are said to be modulated in push-pull, which means modulated by voltages in phase opposition. Thus, the first control law L1 is written as $V_{BIAS}+V(t)$ whereas the second control law L2 is written as $V_{DC}-V(t)$ where:

$V(t)$ is the modulation voltage, and
$V_{BIAS}$ is a static tension (positive or negative depending on the nature of the electro-optical phenomenon that enables the changing of the effective index of the ring 216A or 216B considered) that enables the possibility of continuously biasing the modulator 212A or 212B considered.

In the carrier injection mode, the first control law L1 is a voltage varying between $V_{BIAS}$ and $V_{BIAS}-A$, where A is a positive value and $V_{BIAS}$ is a value strictly greater than A. The second control law L2 is a voltage varying between $V_{BIAS}$ and $V_{BIAS}+\beta^*A$, where $\beta$ is a positive value. In this case, the two modulators 212A and 212B are continuously biased to the voltage $V_{BIAS}$.

More specifically, when the voltage applied by the first control law L1 varies from $V_{BIAS}$ to $V_{BIAS}-A$ to give rise to the variation in index of $\Delta$Neff1, the voltage applied by the second control law L2 varies from $V_{BIAS}$ to $V_{BIAS}+\beta^*A$ to give rise to the variation in index $\Delta Neff2=-\Delta Neff1$. Conversely, when the voltage applied by the first control law L1 varies from $V_{BIAS}-A$ to $V_{BIAS}$ to give rise to the variation in index of $-\Delta Neff1$, the voltage applied by the second control law L2 varies from $V_{BIAS}+\beta^*A$ to $V_{BIAS}$ to give rise to the variation in index $-\Delta Neff2$.

The table here below lays out the correspondence between the voltages applied by the control laws L1 and L2 of the modulators 212A and 212B according to the bit to be transmitted 0 or 1, in order to ensure the generation of a modulation free of chirp in the carrier injection mode.

| Bit | 1 | 0 |
|---|---|---|
| Voltage applied to the first modulator 12A | $V_{BIAS} - A$ | $V_{BIAS}$ |
| Voltage applied to the second modulator 12B | $V_{BIAS} + \beta^*A$ | $V_{BIAS}$ |

In the carrier depletion mode, the first control law L1 is a voltage that varies between $-V_{BIAS}$ and $-V_{BIAS}+A$, where A is a positive value and $V_{BIAS}$ is a value strictly greater than A. The second control law L2 is a voltage that varies between $-V_{BIAS}$ and $-V_{BIAS}-\beta^*A$, where $\beta$ is a positive value. In this case, the two modulators 212A and 212B are continuously biased to the voltage $-V_{BIAS}$.

More precisely, when the voltage applied by the first control law L1 varies from $-V_{BIAS}$ to $-V_{BIAS}+A$ to give rise to the variation in index of $\Delta Neff1$, the voltage applied by the second control law L2 varies from $-V_{BIAS}$ to $-V_{BIAS}-\beta^*A$ to give rise to the variation in index $\Delta Neff2=-\Delta Neff1$. When the voltage applied by the first control law L1 varies from $-V_{BIAS}+A$ to $-V_{BIAS}$ to give rise to the variation in index $-\Delta Neff1$, the voltage applied by the second control law L2 varies from $-V_{BIAS} \beta^*A$ to $V_{BIAS}$ to give rise to the index variation $-\Delta Neff2$.

The table here below lays out the correspondence between the voltages applied by the control laws L1 and L2 of the modulators 12A and 12B according to the bit to be transmitted 0 or 1, in order to ensure the generation of a modulation free of chirp in the carrier depletion mode.

| Bit | 1 | 0 |
|---|---|---|
| Voltage applied to the first modulator 12A | $-V_{BIAS} + A$ | $-V_{BIAS}$ |
| Voltage applied to the second modulator 12B | $-V_{BIAS} - \beta^*A$ | $-V_{BIAS}$ |

Figure 9:
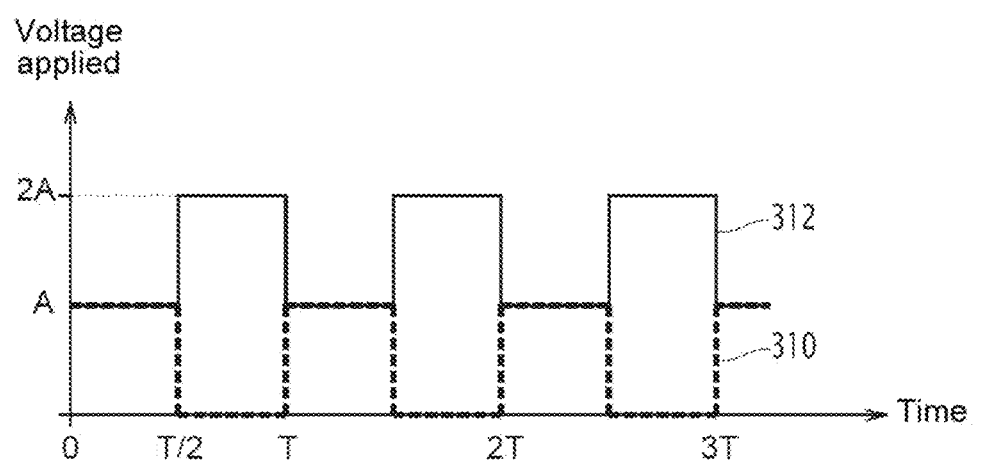
FIG. 9, a graph showing the evolution over time of an example of voltage control laws applied to the unit of FIG. 7.

According to the particular case illustrated in FIG. 9, in the carrier injection mode, the static voltage $V_{BIAS}$ is A, with A being a positive value. The first control law L1 is then a binary voltage varying between 0 and A, where A is a strictly positive value and the second control law L2 is a binary voltage varying between A and 2A.

More precisely, over a bit 0 to be transmitted, a modulation voltage of amplitude $V(t)=-A$ is applied to the two rings 216A, 216B, while over a bit 1, a voltage of amplitude $V(t)=A$ is applied to the two rings 216A, 216B.

Expressed in alternative terms, the first control law L1 and the second control law L2 are such that when the voltage applied by the first control law L1 is zero, the voltage applied by the second control law L2 is equal to 2A and when the voltage applied by the first control law L1 is a voltage that amounts to A, the voltage applied by the second control law L2 is equal to A.

In the case of a carrier depletion mode, the static voltage $V_{BIAS}$ then amounts to $-A$, where A is a positive value. The first control law L1 is then a binary voltage varying between 0 and $-A$, where A is a strictly positive value and the second control law L2 command is a binary voltage varying between $-A$ and $-2A$.

More precisely, over a bit 0 to be transmitted, a modulation voltage of amplitude $V(t)=-A$ is applied to the two rings 216A, 216B, while over a bit 1, a voltage of amplitude $V(t)=A$ is applied to the two rings 216A, 216B.

Expressed in alternative terms, the first control law L1 and the second control law L2 are such that when the voltage applied by the first control law L1 is zero, the voltage applied by the second control law L2 is equal to $-A$ and when the voltage applied by the first control law L1 is a voltage that amounts to $-A$, the voltage applied by the second control law L2 is equal to $-2A$.

For such control laws, in operation, the modulation device 210 is such that the chirp parameter $\alpha 1$ introduced by the first modulator 212A and the second chirp parameter $\alpha 2$ have opposite chirp rates.

The associated performances are illustrated by the FIGS. 4 and 5. In the FIGS. 4 and 5, the curves represented in dotted lines are related to a device having a single ring while the curves represented in solid lines correspond to the modulation device 210 according to the first embodiment shown in FIG. 1. The simulated performances are so for a parameter of radius of curvature of the rings R equal to 5 μm (microns), a length of interaction zero and coupling parameters equal to 0.0546.

Figure 10:
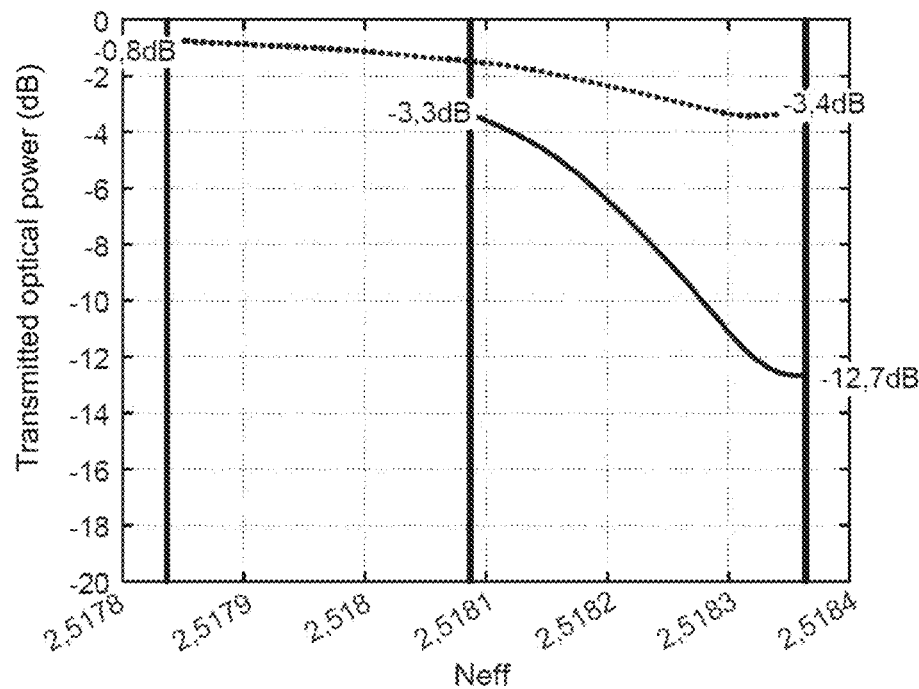
FIGS. 10 and 11, graphs showing the simulated evolution of the intensity and phase, respectively, of the optical chirp as a function of the variation between the effective index at the output of the unit of FIG. 7 and the output of a unit with a single resonant ring modulator.

For FIG. 10, the following table provides the ability to perform a comparison of the performance results obtained:

|  | State of the Art (dB) | Invention (dB) |
|---|---|---|
| Transmission losses over the ON state | −0.8 | −3.3 |
| Transmission losses over the OFF state | −3.4 | −12.7 |
| Extinction Ratio | 2.6 | 9.4 |

It is in particular noted that the extinction ratio is higher with the modulation device 10 according to the invention, which is advantageous (obtaining a better modulation).

Figure 11:
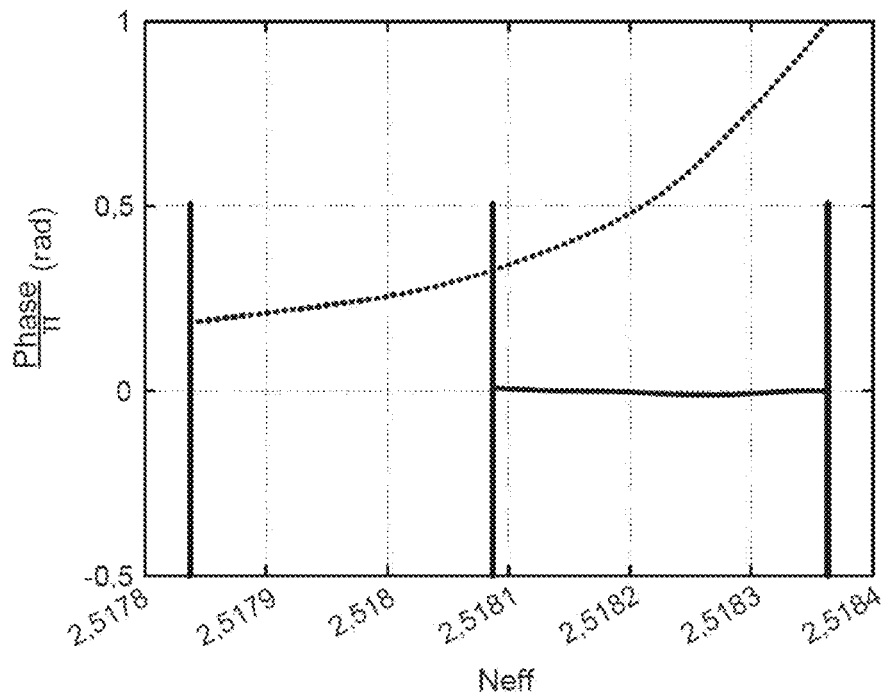

Furthermore, it is shown in FIG. 11 that the chirp parameter $\alpha$ is comprised between −0.3 and 0 for a variation in effective index between $-3 \times 10^{-4}$ and 0. It follows therefrom that the chirp parameter $\alpha$ is close to zero over the range of optimal modulation for the modulation device 210 according to the first embodiment.

Figure 13:
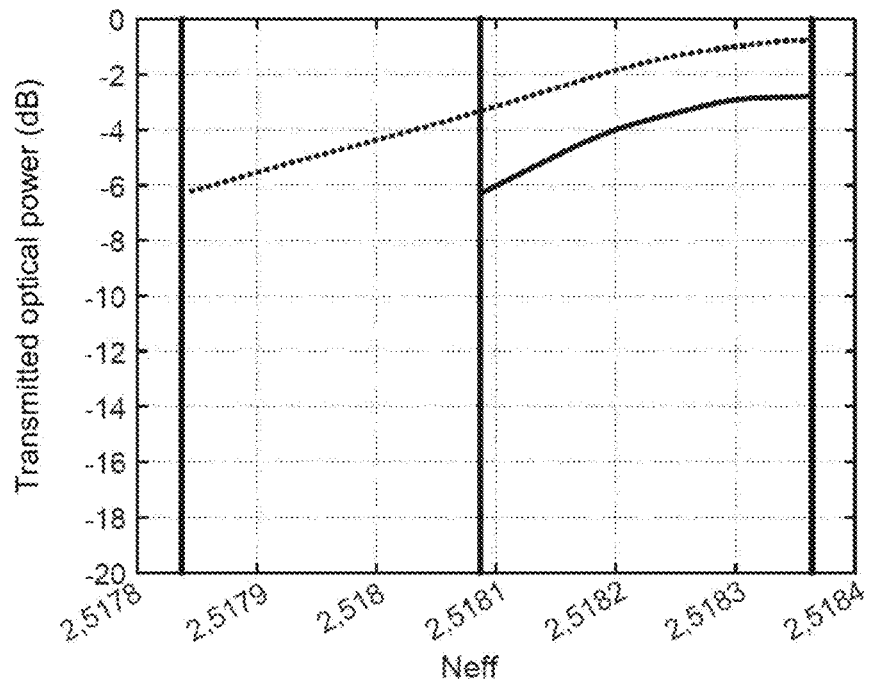
FIGS. 13 and 14, the same figures as 10 and 11, respectively, for the unit according to the second example.
Figure 14:
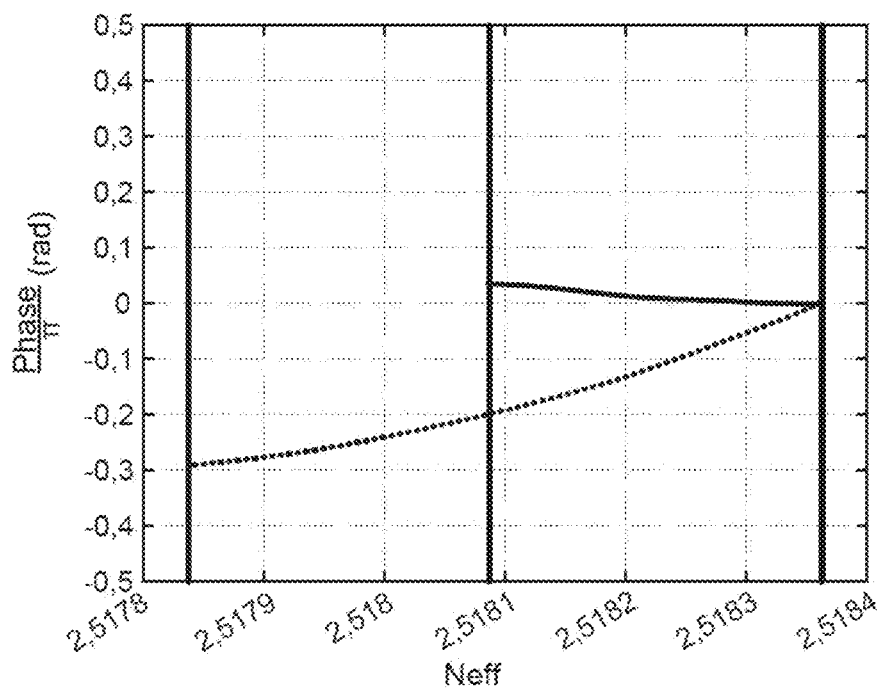
Figure 15:
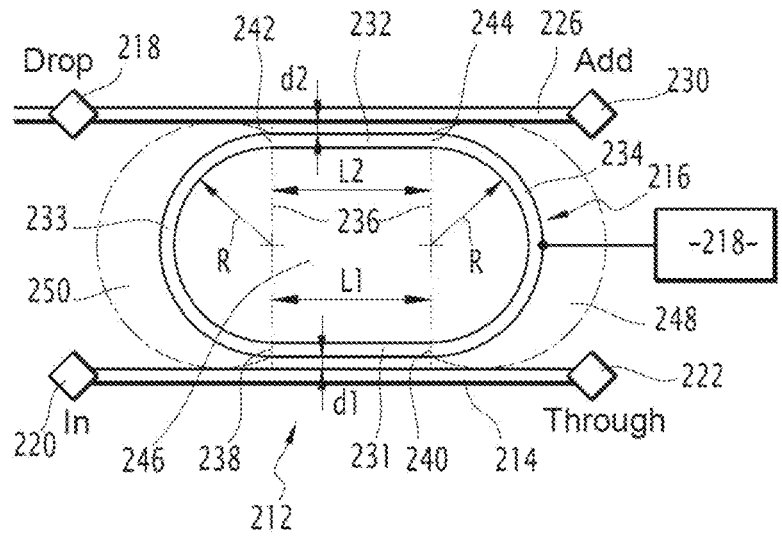
FIG. 15, a diagrammatic view of a resonant ring modulator.
Figure 16:
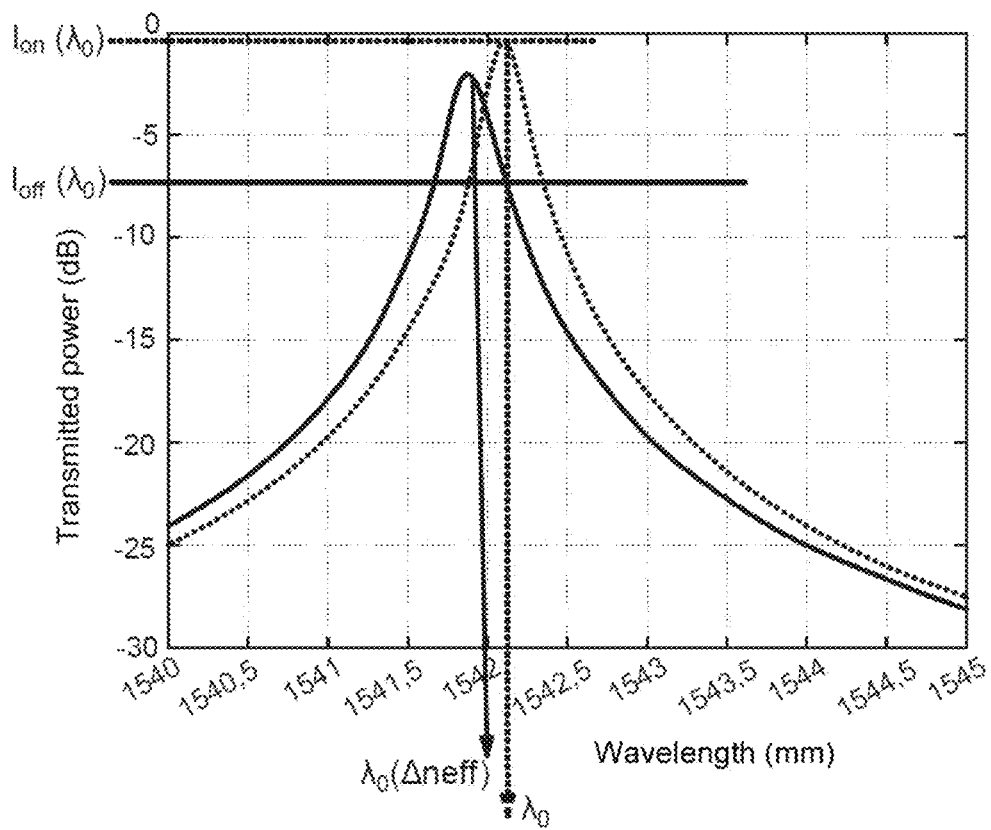
FIG. 16, a graph showing the simulated evolution of the modulus of the transfer function at the output of the Drop port as a function of the wavelength of the light at the input of the modulator of FIG. 15 in the presence and absence of modulation of the effective index of the rings.
Figure 17:
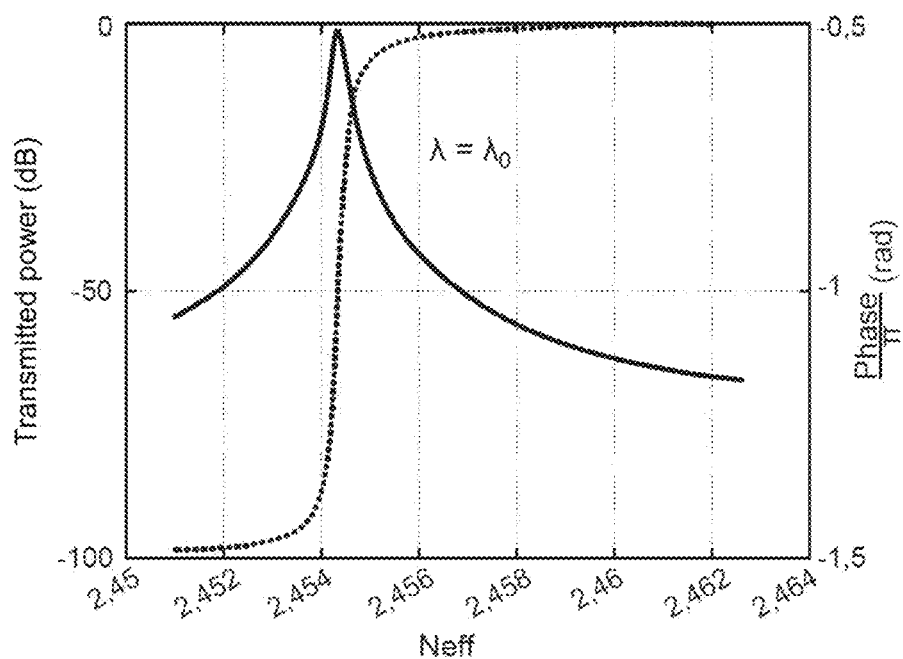
FIG. 17, a graph showing the evolution of the modulus of the transfer function as well as the phase of the transfer function at the resonance wavelength at the output of the Drop port as a function of the selective index for the modulator of FIG. 15.
Figure 18:
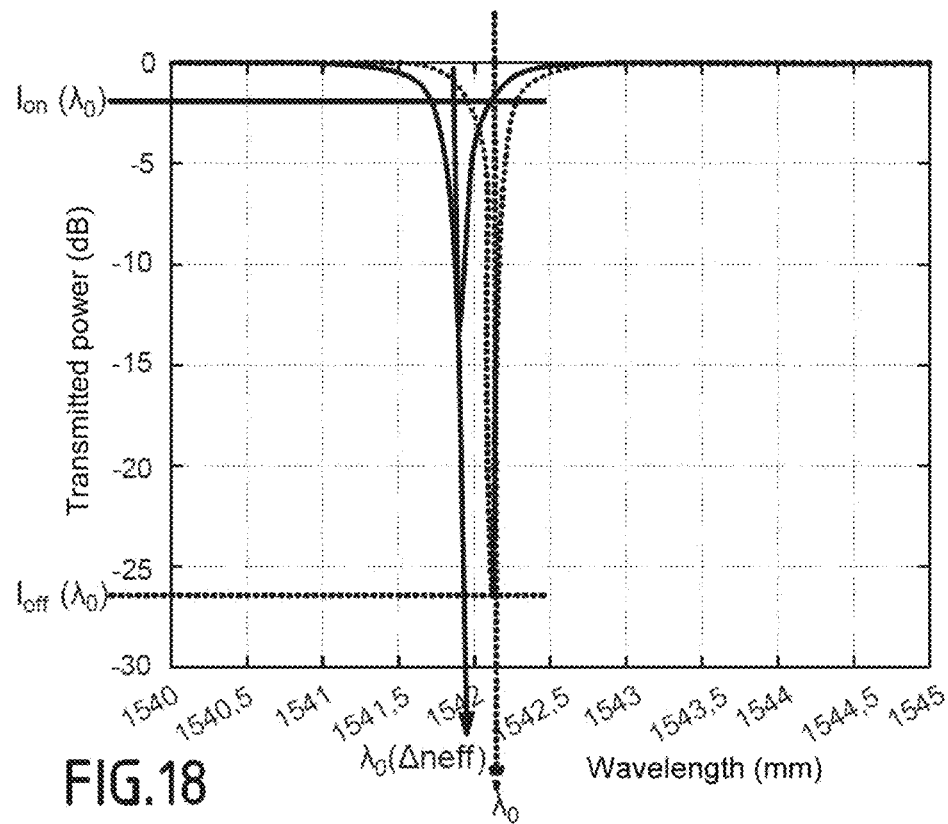
FIGS. 18 and 19, the same figures as 16 and 17 at the output of the Through port instead of the Drop port.
Figure 19:
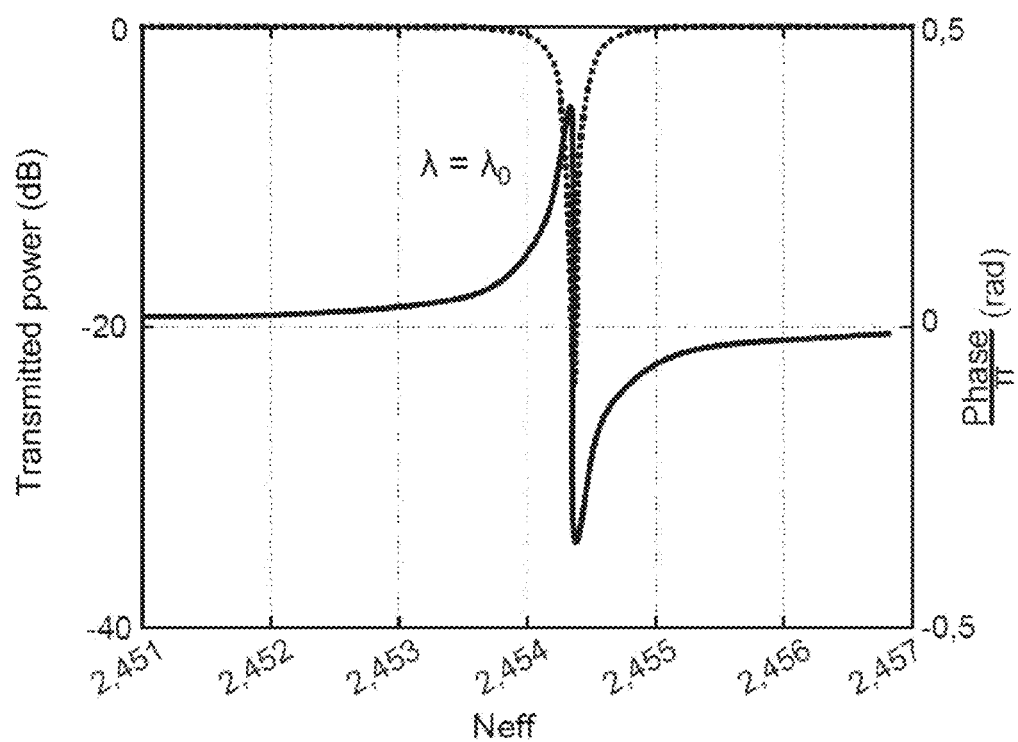

Similar observations may be noted in the FIGS. 13 and 14 for the modulation device 210 according to the second embodiment wherein the coupling parameters are taken as equal to 0.02.

In the various different embodiments, the modulation device 210 according to the invention presents better performance than a device having only a single ring resonator modulator.

In order to control a ring resonator modulator, a voltage varying between 0 and V is applied. Upon denoting the capacitance of the ring as C, the consumption of the modulator is $C \cdot V^2$.

In the case of the modulation device 210, to each ring 216A, 216B, a voltage having an amplitude of V/2 is applied. More precisely, the voltage applied to the ring 216A of the first modulator 212A varies between 0 and V/2 and the voltage applied to the ring 16B of the second modulator 212B varies between V/2 and V. Upon denoting the capacitance of each of the rings 216A, 216B as C, the consumption of the modulation device 210 is given by:

$$2C \cdot (V/2)^2 = C \cdot V^2/2$$

Thus, the modulation device 210 of the invention consumes two times less electrical energy than a modulation device comprising only a single ring resonator modulator for generating an intensity modulation of an optical signal.

In addition, at the wavelength of operation of the modulation device 210, the extinction ratio is greater for the modulation device 210 according to the invention than for a modulation device comprising only a single ring resonator modulator.

The modulation of the optical signal is thus of better quality when the modulation device 210 according to the invention is used.

Figure 8:
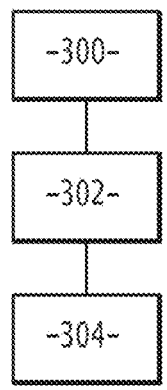
FIG. 8, a flowchart of an example method for canceling the chirp of the unit of FIG. 7.

Furthermore, excursion of the phase of the optical field at the output of the modulation device 210 according to the invention is also reduced relative to the excursion at the output of a modulation device with a single ring resonator modulator. Upon observation of the FIGS. 5 and 8, it appears indeed that the phase presents a much lower excursion than the excursion of the phase observed for a device comprising one single ring modulator.

The values of the characteristics that influence the chirp for the modulation device 10 are, for example, obtained by a cancellation method. This cancellation method is described with reference to the flowchart shown in FIG. 2.

The method comprises the step 300 of choosing of the initial characteristics of the modulation device 210.

The method then comprises the step 302 of modification of at least one of the initial characteristics of the modulation device 210 for generating a modulation such as to minimise the absolute value of the chirp introduced by the device 210 for generating a modulation for an incident optical signal.

By way of an illustration, this modification is performed by a series of iterations in an optimisation programme. The goal of this optimisation programme, starting from the initial characteristics, is to obtain the characteristics of the modulation device 210 that confer on the modulation device 210 a chirp parameter α that as much as possible approaches the value zero.

For this, a cost function C, representative of deviations for the chirp parameter α between the modulation device 210 controlled by the voltage control laws to be optimised and 0 is defined as follows. The cost function C written in the following form is considered:

$$C = \alpha_i^2$$

Where:
$\alpha_i$ is the value of the chirp parameter α introduced by the modulation device 210 to which are applied the voltage control laws to be optimised to the i-th iteration.

The value $\alpha_i$ is calculated by making use of a numerical simulation.

The cost function C thus defined is a positive function that should be minimised during the course of the step 302 of modification of the control laws.

In order to proceed with performing this minimization, it is sufficient to start from the characteristics initially chosen in the step 300 of choosing the characteristics and to use a calculation method that provides the ability to reduce by iterations the value of the cost function C.

By way of an example, the calculation method used is a damped least squares method (often referred to by the English acronym DLS for "damped least-squares").

The characteristics to be applied to the modulation means 210 are thus obtained for the modulation device 210, after iterations of the optimization program.

The proposed method presents the advantage of being easy to put into practice.

In a preferred variant embodiment, the cancellation of the chirp parameter α is obtained without iterations, with a calculation that enables obtaining the characteristic leading to such a cancellation.

According to preferred embodiments, during the step of selection, the initial characteristics for the device 210 for generating a modulation are such that the two ring resonator modulators 212A, 212B are identical. This makes it possible to further simplify the implementation of the cancellation process.

In order to further enhance this effect, during the modification step, only the characteristics relating to the first control law L1 and the characteristics relating to the second control law L2 are modified. In such a situation, the calculation can be performed without the use of iterations.

For example, in the step of modification, the first control law L1 and the second control law L2 are modified such that when the first effective index Neff1 varies by a first quantity, the second effective index Neff2 varies by a second quantity of equivalent magnitude but with the opposite sign relative to the first quantity. This makes it possible to obtain, by way of illustration, the control laws L1 and L2 obtained with reference to the FIG. 3.

In practice, the proper operation of the two ring resonator modulators 212A, 212B is in particular sensitive to the temperature of the ambient environment and to variations in the implementation of the process of manufacturing these modulators 212A, 212B. On account of this, there may be some misalignments occurring between the emission wavelength of the laser source powering the device 210 for generating a modulation and the resonance wavelength of the first ring 216A on the one hand, and on the other hand, the wavelength of the laser source and the resonance wavelength of the second ring 216B. To recap, the resonance wavelength of each of the rings 216A, 216B is controlled by a control device 218A, 218B respectively. The misalignments in wavelength result in the malfunctioning of the device 210 for generating a modulation.

In order to avoid such misalignments, a method for calibrating and a method for locking are also provided.

The method for calibrating uses a calibration system for calibrating the device 210 for generating a modulation. An example of such a calibration system 400 is represented in FIG. 20.

Figure 20:
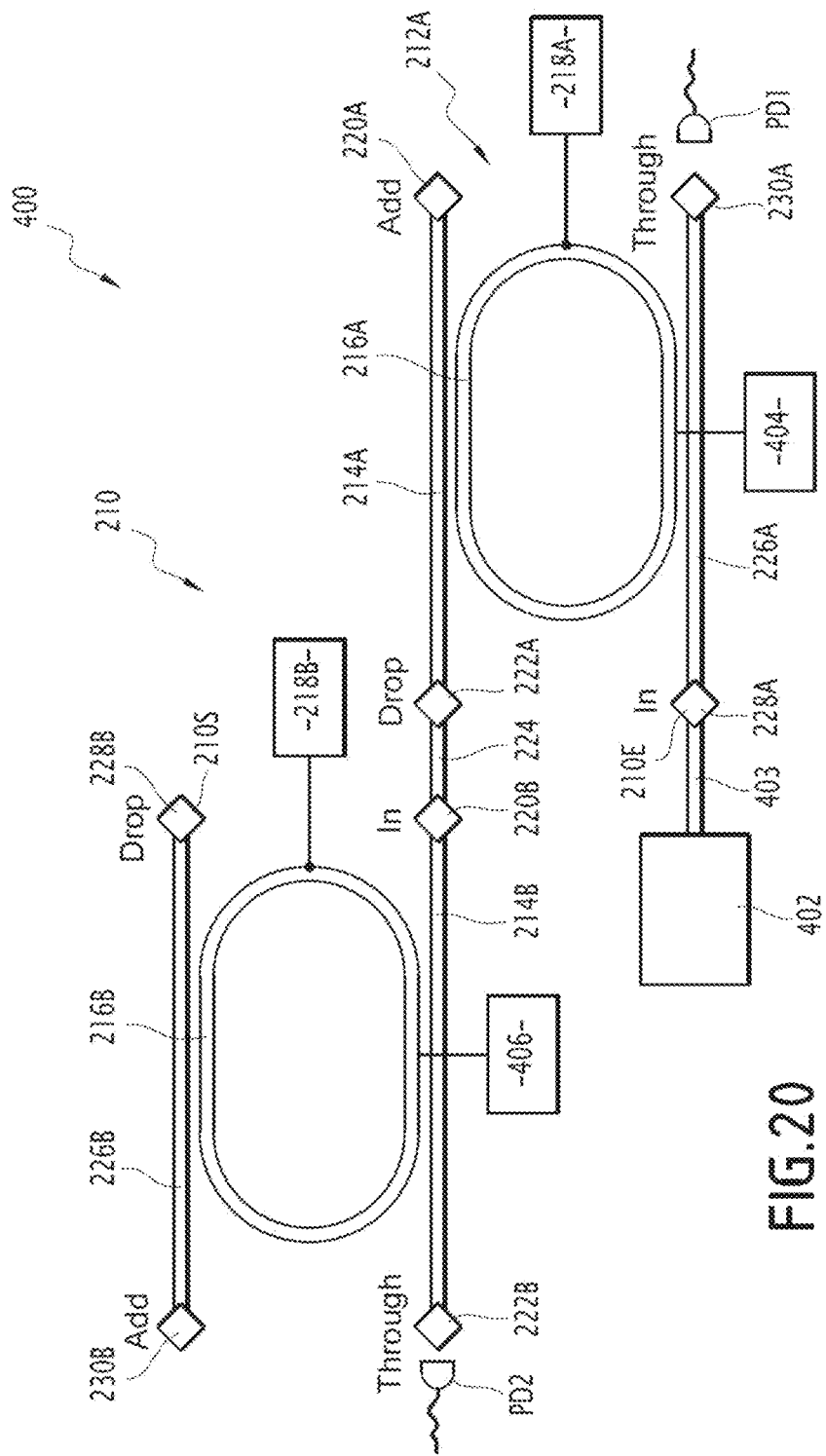
FIG. 20, a diagrammatic view of an example calibration system.

According to the example shown in FIG. 20, the calibration system 400 comprises a standard laser source 402, a device 210 for generating a modulation, a first photodiode PD1 and a second photodiode PD2.

The standard laser source 402 is a laser source that is capable of emitting a wave having a wavelength that is referenced as an absolute value. For this reason, the emission wavelength of the standard laser source 402 is assumed to be fixed for the calibration system 400 and is denoted in the following sections as $\lambda_{calibration}$.

The standard laser source 402 is connected to the input 210E of the device 210 for generating a modulation, for example via a waveguide 403. The standard laser source 402 is thus capable of injecting a wave whose wavelength $\lambda_{calibration}$ is referenced as an absolute value.

In the case of FIG. 20, the device 210 for generating a modulation is the device 210 for generating a modulation as shown in the FIG. 12, that is a modulation unit 210 according to the second example.

In addition, the device 210 for generating a modulation is provided with two units for shifting the resonance wavelength 404, 406.

The first wavelength shifting unit 404 is capable of shifting the resonance wavelength of the first modulator 212A. Such a shift is, based on the first wavelength shifting unit 304 considered, a shift to higher or lower wavelengths.

By way of an example, the first wavelength shifting unit 404 is a heating element of the first ring 216A that provides the ability to locally modify the temperature of the first ring 216A, and thus the propagation index of the first ring 216A. This results in a modification of the resonance wavelength of the first modulator 212A.

The second wavelength shifting unit 406 is capable of shifting the resonance wavelength of the second modulator 212B. Such a shift is, based on the second wavelength shifting unit 304 considered, a shift to higher or lower wavelengths.

By way of an example, the second wavelength shifting unit 404 is a heating element of the second ring 216B that provides the ability to locally modify the temperature of the second ring 216B, and thus the propagation index of the second ring 216B. This results in a modification of the resonance wavelength of the second modulator 212B.

By way of a variant, the calibration system 400 is applicable to any type of device 210 for generating a modulation as described in the present application.

The first photodiode PD1 is positioned at the output of the Through port 230A of the first ring 216A. The first photodiode PD1 is thus capable of collecting the signal at the output of the Through port 230A.

By way of a variant, another type of photodetector may be used.

The second photodiode PD2 is positioned at the output of the Through port 222B of the second ring 216B. The second photodiode PD2 is thus capable of collecting the signal at the output of the Through port 222B.

By way of a variant, another type of photodetector may be used.

The operating of the calibration system 400 shall now be described with reference to the implementation of an example of the calibration method of the device 210 for generating a modulation.

In the general case, prior to the implementation of the method for calibrating, the resonance wavelength of the first modulator 212A, the resonance wavelength of the second modulator 2126 and the wavelength $\lambda_{calibration}$ of emission of the standard laser source 402 are distinct considered in pairs.

The method for calibrating comprises a step of injecting a wave at a reference wavelength in the device 210 for generating a modulation. The injection step is carried out by injection of a wave coming from the standard laser source 402 at the input of the device 210 for generating a modulation. The reference wavelength is, thus, the wavelength $\lambda_{calibration}$ of emission of the standard laser source 402.

The method for calibrating comprises, subsequently, a step of adjustment of the resonance wavelength of the first modulator 212A on the reference wavelength $\lambda_{calibration}$ by using the signal at the output 222A of the first waveguide 214A when the wave at the wavelength $\lambda_{calibration}$ of emission of the standard laser source 402 is injected into the device 210 for generating a modulation.

The step of adjusting of the resonance wavelength of the first modulator 212A is carried out by using the first wavelength shifting unit 404 in order to cause a transmission minimum of the transfer function of the first modulator 212A to coincide with the wavelength $\lambda_{calibration}$ of emission of the standard laser source 402.

A convenient way of obtaining such a coincidence is to use the signal from the first photodiode PD1. Indeed, the observation of a local minimum of local intensity over the signal from the first photodiode PD1 corresponds to the occurrence of a coincidence between a transmission minimum of the transfer function of the first modulator 212A with the wavelength $\lambda_{calibration}$ of emission of the standard laser source 402.

In other words, according to a preferred embodiment, the step of adjusting of the resonance wavelength of the first modulator 212A is carried out by adjusting the first wavelength shifting unit 304 until observing a minimum of intensity in the signal from the first photodiode PD1.

At the conclusion of the step of adjusting of the resonance wavelength of the first modulator 212A, the wavelength $\lambda_{calibration}$ of emission of the standard laser source 402 and the resonance wavelength of the first modulator 212A are equal.

The method for calibrating comprises, subsequently, a step of adjustment of the resonance wavelength of the second modulator 212B on the reference wavelength by using the signal at the output 228B of the second waveguide 214B when the wave at the wavelength $\lambda_{calibration}$ of emission of the standard laser source 402 is injected into the device 210 for generating a modulation.

The step of adjusting of the resonance wavelength of the second modulator 212B is carried out by using the second wavelength shifting unit 406 in order to cause a transmission minimum of the transfer function of the second modulator 212B to coincide with the wavelength $\lambda_{calibration}$ of emission of the standard laser source 402.

A convenient way of obtaining such a coincidence is to use the signal from the second photodiode PD2. Indeed, the observation of a local minimum of local intensity over the signal from the second photodiode PD2 corresponds to the occurrence of a coincidence between a transmission minimum of the transfer function of the second modulator 2126 with the wavelength $\lambda_{calibration}$ of emission of the standard laser source 402.

In other words, according to a preferred embodiment, the step of adjusting of the resonance wavelength of the second modulator 212B is carried out by adjusting the second wavelength shifting unit 406 until observing a minimum of intensity in the signal from the second photodiode PD2.

At the conclusion of the step of adjusting of the resonance wavelength of the second modulator 212B, the wavelength $\lambda_{calibration}$ of emission of the standard laser source 102 and the resonance wavelength of the second modulator 212B are equal.

The method for calibrating thus ensures the ability to align the resonance wavelengths of the two modulators 212A, 212B on a reference wavelength provided that there is available a laser source capable of emitting at the desired reference wavelength.

The proposed method for calibrating presents the advantage of being easy to implement since only the addition of two photodetectors on an unused port of the first modulator 212A and the unused port of the modulator 212B is involved. In addition, the method for calibrating is robust.

The method for locking uses a lock system that enables locking the wavelength of a laser source over the resonance wavelength of the second ring modulator 212B.

Figure 21:
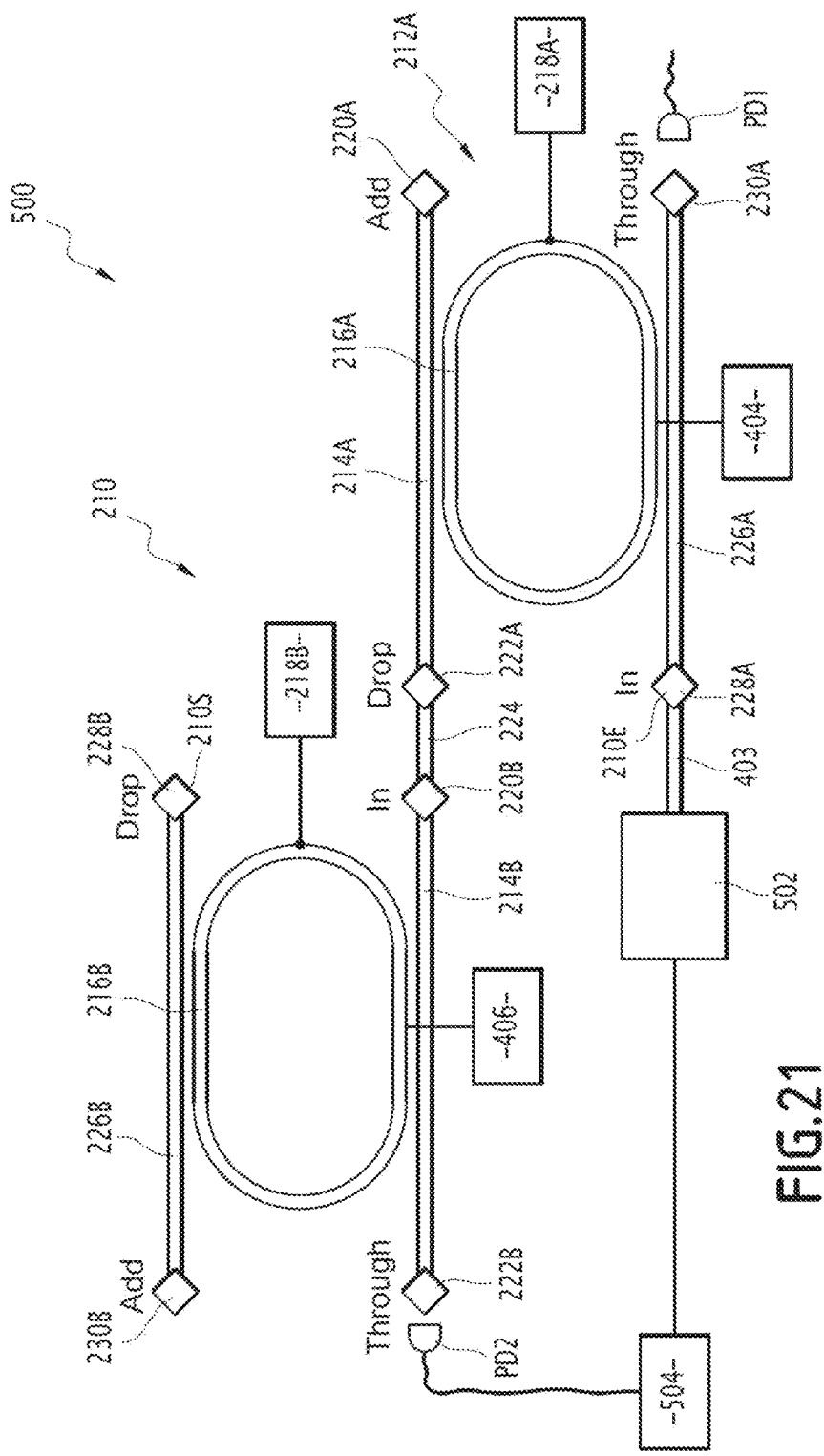
FIG. 21, a diagrammatic view of an example closed-loop control system.
Figure 22:
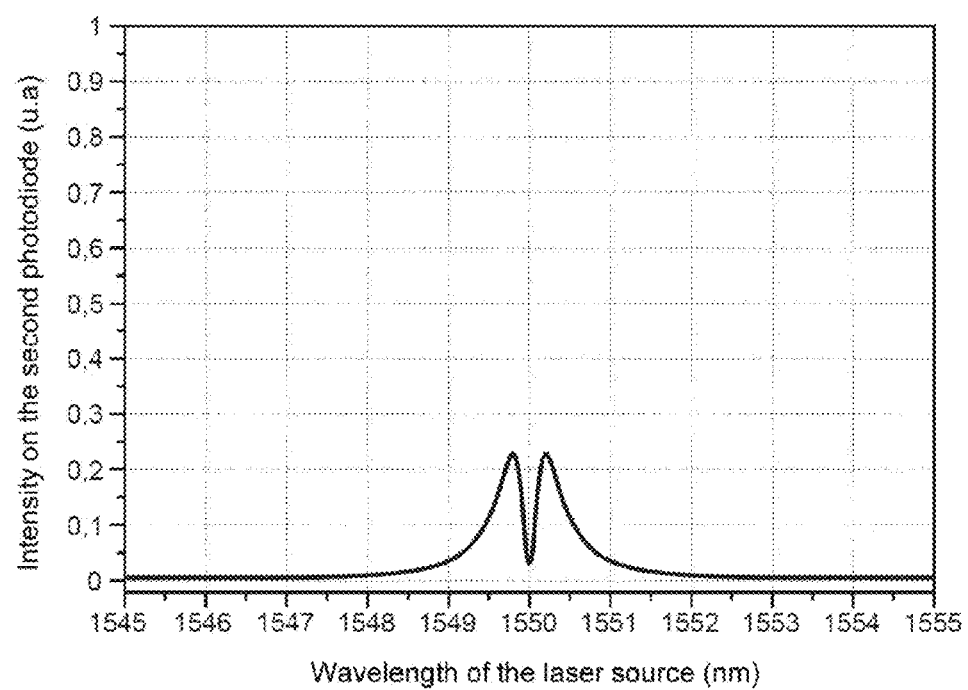
FIG. 22, a graph illustrating the intensity of two light signals as a function of the wavelength of the wave to be modulated by the modulation unit.

An example of such a lock system 500 is shown in the FIG. 21.

The lock system 500 is similar to the calibration system 500 described with reference to the FIG. 20. As a result, only the elements which are different are described in the following sections, with the understanding that the other notes describing the calibration system 400 are equally valid and applicable to the lock system 500.

Instead of the standard laser source 402, the lock system 500 comprises a laser source 502; this laser source 502 being capable of emitting a wave at a wavelength that is likely to vary over time, in particular due to the thermal heating.

The lock system 500 also comprises a control unit 504 for controlling the laser source 502 connected on the one hand to the second photodiode PD2 and on the other hand to the laser source 502.

The control unit 504 is capable of converting the signal from the second photodiode PD2 into a lock signal, this lock signal serving to generate a command for the laser source 502 to be used for modifying the wavelength of emission of the laser source 502.

Typically, the control unit 504 comprises of a comparator and an actuator. The comparator is capable of comparing the difference between the current value of the signal from the second photodiode PD2 and an ideal value and of converting the difference into a set point to be used for reducing the difference. The actuator is capable of applying the set point on the laser source 502. For example, the set point is a value for current.

The proposed method for locking is based on the exploitation of the shape of the spectral response of the second photodiode PD2. This shape is illustrated in the FIG. 16. It appears that the spectral response of the second photodiode PD2 has a local minimum of intensity when the wavelength of the laser source 402 is perfectly aligned with the resonance lengths of the two ring modulators 212A, 212B. By using the spectral response of the second photodiode PD2 as an error signal, it is thus possible to lock the wavelength of the laser source 502.

The method for locking proposed presents the advantage of being easy to implement and of being robust.

6.2.2—General Details about Ring Modulators (Annex)

In optical transmissions, optical intensity modulation devices are generally used. There devices are of two types.

Certain modulation devices have the ability to directly modulate the optical intensity of the incident light wave when a modulated electrical command is applied to the device. The electro-absorption modulator, often referred to by the acronym EAM which is abbreviated from the English term "electro-absorption modulator", is one example of such devices.

Other modulators modulate the phase of the optical field of the incident light wave. By arranging a phase modulator in an interferometer, it is thus possible to obtain a modulation device capable of modulating the optical intensity of the incident light wave. The Mach-Zehnder modulator and the ring resonator modulator both belong to this type of modulator.

The ring resonator type modulator is often referred to by its English acronym RRM for "Ring Resonator Modulator". This device is particularly well known in the "silicon photonics" technology or "CMOS (Complementary Metal Oxide Semiconductor) photonics", wherein the modulator is implemented on a silicon substrate comprising a "silicon on insulator" stack. The ring resonator modulator, as developed in "silicon photonics" technology is described for example in the articles by Sasikanth Manipatruni, entitled "*Ultra-low voltage, ultra-small mode volume silicon microring modulator*", which was published in the journal OPTICS EXPRESS, Volume 18, Number 17 dated 16 Aug. 2010, and by Lin Zhang, entitled "*Silicon-Based Microring Resonator Modulators for Intensity Modulation*" published in the IEEE JOURNAL OF SELECTED TOPICS IN QUANTUM ELECTRONICS, Volume 16, Number 1, dated January/February 2010

Such a ring resonator modulator 212 is, for example, illustrated in the FIG. 9.

The modulator 212 comprises a waveguide 214 having an input and an output, and a ring waveguide 216. The ring waveguide is simply referred to as ring 216 in the rest of the annex.

The input 220 of the first waveguide 214 is a first light injection port 220 for the modulator 212 denoted by the English term "In Port".

The output 222 of the first waveguide 214 is a first light output port 22 for the modulator 212 denoted by the English term "Through port".

The previously mentioned English terms are generally used by the person skilled in the art specialising in this field and shall be used in the remainder of the annex. Thus the input 220 of the first waveguide 214 will be called In port and the output 222 of the waveguide 214 shall be called Through port.

A ring waveguide 216 is a waveguide having the shape of a closed loop.

The ring 216 presents, according to the example shown in FIG. 1, a substantially oblong shape. Such a ring 216 is often referred to by the English appellation "racetrack" on account of its similarity to a track for motor racing.

By way of a variant, the ring 216 has a circular shape.

The ring 216 is optically coupled to the waveguide 214. This signifies that the arrangement of the ring 216 and the waveguide 214 is such that a part of the light guided in the waveguide 214 is capable of being coupled and then of being guided in the ring 216.

Such a coupling is usually characterised by a coupling parameter denoted as K. By definition, the amplitude coupling parameter K is the ratio of the amplitude of the optical field which is coupled from the waveguide to the ring relative to the amplitude of the incident optical field in the waveguide.

The mode being propagated in the ring 216 is characterised by an effective index Neff. The term "effective index" is understood to refer to the index of the guided mode in the ring 216.

The modulator 212 also comprises a control device 218 capable of modulating the effective index Neff of the ring 16 in accordance with a control law.

By way of an example, the control device 218 is capable of applying a modulating voltage between the outer doped zones N (or P) and the inner doped zone P (N respectively) of the ring 16 in a manner such that the effective index Neff of the ring 16 varies. Thus, the control device 18 modulates the effective index Neff of the ring 16 between a value N0 (corresponding to a voltage V0) and a value Nmax (corresponding to a voltage Vmax).

By definition, when the effective index of the ring 216 is equal to the value N0, the modulator 212 is in the ON state.

The optical intensity measured at the output of the modulator 212 in this ON state is known as $I_{ON}$. Similarly, when the effective index of the ring 216 is equal to the value Nmax, the modulator 212 is in the OFF state. The optical intensity measured at the output of the modulator 212 in this OFF state is known as $I_{OFF}$.

One of the means of characterising the performance of the modulator 212 is to provide the extinction ratio ER thereof which is defined by $$ER = 10.\log\left[\frac{I_{ON}}{I_{OFF}}\right].$$

In operation, when the light originating for example from a laser diode is injected into the in port of the modulator 212, the light is guided in the waveguide 214. A part of this light is coupled in the ring 216. After being propagated a certain number of times in the ring 216, the light is decoupled again in the waveguide 214. When the optical path traversed in the ring 216 corresponds to an integer times the wavelength of the light, a resonance is created in the ring 216, which results in a transmission minimum, at this wavelength, known as resonance transmission minimum, at the Through port of the waveguide 214.

This resonance wavelength shifts when the effective index of propagation of the mode in the ring 216 varies, under the action of a control device 218. At a given wavelength, a variation in the optical transmission then appears depending upon the control law.

In some cases, as illustrated for the example shown in the FIG. 9, the modulator 212 also comprises a second waveguide 226 having an input 230 and an output 218. The waveguide 214 is then referred to as the "first waveguide".

The input 230 of the second waveguide 226 is a second light injection port 230 for the modulator 212 denoted by the English term "Add port".

The output 218 of the second waveguide 226 is a second light output port 218 for the modulator 212 denoted by the English term "Drop port".

The previously mentioned English terms are generally used by the person skilled in the art specialising in this field and shall be used in the remainder of the annex. Thus the input 230 of the second waveguide 226 will be called the Add port and the output 218 of the second waveguide 226 will be called Drop Port.

The ring 216 is also optically coupled to the second waveguide 226.

In operation, when the light originating for example from a laser diode is injected into the in port of the modulator 212, the light is guided in the first waveguide 214. A part of this light is coupled in the ring 216. After being propagated a certain number of times in the ring 216, the light is decoupled again in the second waveguide 226. When the optical path traversed in the ring 216 corresponds to the sum of an integer times the wavelength of the light with half of the wavelength of the light, a resonance is created in the ring 216, which results in a transmission minimum, at this wavelength, known as resonance transmission minimum, at the drop port of the second waveguide 226.

This resonance wavelength shifts when the effective index of propagation of the mode in the ring 216 varies, under the action of a control device 218. At a given wavelength, a variation in the optical transmission then appears depending upon the control law.

In the configuration illustrated by the FIG. 9, two modes of operation have been described, one corresponding to a first transfer function called "Through function" in the following sections as a reference to the fact that the output of the modulator 212 used in this configuration is the Through port and a second transfer function called "Drop function" in the following sections as a reference to the fact that the output of the modulator 212 used in this configuration is the Drop port. The Through and Drop functions are the same whether the modulator 212 is used in either the carrier injection or carrier depletion mode.

In order to mathematically express these functions, it is necessary, first of all, to define the parameters characterising the modulator 212. For the sake of clarity, these parameters shall be defined for the specific geometry of the modulator 212 shown in the FIG. 9, it being understood that the person skilled in the art will know how to define these parameters for any possible geometry.

In the case shown in the FIG. 9, the ring 216 comprises four sections, two intermediate sections 31 and 32 connected to two end sections 233 and 234. each section 231, 232, 233, 234 is delimited by dotted lines 236.

Each intermediate section 231, 232 of the ring 216 is a rectilinear section extending along an axis X.

The first intermediate section 231 is the section which is closest to the first waveguide 214.

The distance d1 between the first intermediate section 231 and the first waveguide 214 is known, in the remainder of the annex, as the distance between the first waveguide 214 and the ring 216.

The first intermediate section 231 extends between a first end 238 and a second end 240.

The distance between the two ends 238 and 240 of the first intermediate section 231 defines the length L1 of the first intermediate section 231. This length L1 corresponds to the length of interaction between the ring 216 and the first waveguide 214.

According to the variant embodiment in which the ring 216 is circular, the length L1 is zero.

The second intermediate section 232 is the section which is closest to the second waveguide 226.

The distance d2 between the second intermediate section 232 and the second waveguide 226 is known, in the remainder of the annex, as the distance between the second waveguide 226 and the ring 216.

The second intermediate section 232 extends between two ends 242 and 244.

The distance between the two ends 242 and 244 of the second intermediate section 232 defines the length L2 of the second intermediate section 232. This length L2 corresponds to the length of interaction between the ring 216 and the second waveguide 226.

According to the variant embodiment in which the ring 226 is circular, the length L2 is zero.

According to the particular example shown in FIG. 9, the two lengths of interaction L1, L2 are equal, which is expressed mathematically by the relationship L1=L2=L.

The two end sections 233, 234 are waveguides in the shape of semi-circles of the same radius of curvature R.

By somewhat imprecise linguistic extension, the radius of curvature R of the end sections 233, 234 is regarded as the radius of curvature of the ring 216.

According to one variant embodiment, the two radii of curvature of the two end sections 233, 234 are different. In this case, the radius of curvature of the ring 226 is an average of the two radii of curvature of the two end sections 233, 234.

Thus, in an entirely general sense, the ring 216 is characterised by five distances which are:
- the distance d1 between the ring 216 and the first waveguides 214 of the modulator 212,
- the distance d2 between the ring 216 and the second waveguide 226 of the modulator 212,
- the radius of curvature R of the ring 216 of the modulator 212,
- the length of interaction L1 between the ring 216 and the first waveguide 214 of the modulator 212,
- the length of interaction L2 between the ring 16 and the second waveguide 226 of the modulator 212.

The modulator 212 is not only characterised by the geometrical parameters as previously presented. The modulator 212 may also be characterised by other parameters which are as follows:
- the voltage control law applied to the ring 216 of the modulator 212,
- the parameter of coupling k1 between the ring 216 and the first waveguide 214 of the modulator 212,
- the parameter of coupling k2 between the ring 216 and the second waveguide 226 of the modulator 212.

It is to be noted that the parameters of coupling k1 and k2 comprises parameters of geometrical type since these parameters depend on the length of interaction L1 and L2 as well as on the distances d1 and d2 between the waveguide considered and the ring 216.

Moreover, any size or linear combination resulting from the above mentioned parameters by means of a mathematical function may be possibly used to characterise the modulator 212.

As shown in the following sections of the description, these parameters are used to express the transfer functions for the modulator 212.

To do this, it is common to define a transfer matrix for the ring 216. This transfer matrix M is defined by the following relationship:

$$\begin{vmatrix} E_{add}(t) \\ E_{drop}(t) \end{vmatrix} = M \begin{vmatrix} E_{in}(t) \\ E_{Through}(t) \end{vmatrix}$$

Where:
$E_{add}(t)$ is the optical field at the Add port of the ring 216
$E_{drop}(t)$ is the optical field at the Drop port of the ring 216
$E_{in}(t)$ is the optical field at the In port of the ring 216, and
$E_{through}(t)$ is the optical field at the Through port of the ring 216.

The transfer matrix M is written as:

$M = H_2 \cdot G \cdot H_1$

Where:

$$H_1 = -\frac{1}{ik_1^2}\begin{vmatrix} -\sqrt{1-k_1^2} & e^{-i\beta L} \\ -e^{-i\beta L} & \sqrt{1-k_1^2} \end{vmatrix},$$

$$H_2 = -\frac{1}{ik_2^2}\begin{vmatrix} -\sqrt{1-k_2^2} & e^{-i\beta L} \\ -e^{-i\beta L} & \sqrt{1-k_2^2} \end{vmatrix},$$

$$G = \begin{vmatrix} 0 & \alpha \cdot e^{i\beta L} \\ \frac{1}{\alpha} \cdot e^{-i\beta L} & 0 \end{vmatrix},$$

$\alpha = a^2$ is the attenuation of the optical intensity after a turn of the ring 216,
$\lambda_{OPT}$ is the wavelength of the light at the input of the modulator 212, and $$\beta = \frac{2\pi N_{eff}}{\lambda_{OPT}}.$$

For an optical field $E_{in}$ at the input of the modulator, the optical power $P_{in}$ amounts to 1 and the phase $\phi_{in}$ is zero (a simple normalisation makes it possible to be brought back to this case), this matrix equation provides the ability to deduce the transfer functions known as "Drop function" and "Through function" previously defined above.

The FIG. 10 is a graph illustrating the evolution of the modulus of the transfer function known as Drop function, that is to say the variation of the intensity transmitted at the Drop port, depending on the wavelength of the light at the input of the ring 216. The curve represented in dotted line illustrates the evolution of the transfer function modulus with no variation of the effective index of the ring 216 whereas the curve represented in solid line shows the evolution of the transfer function modulus in the presence of a variation of the effective index of the ring 216 of $2.10^{-4}$. In the context of this simulation, the characteristic values taken for the ring 16 are R=5 μm, L=0, P=2 dB/cm and k=0.2. The outcome observed is a shift of the maximum of the transfer function.

Under the same conditions for simulations, the FIG. 11 is a graph showing the evolution of the modulus of the transfer function known as Drop function as well as of the phase of the transfer function known as Drop function at the resonance wavelength as a function of the effective index Neff of the ring 216. It appears that it is possible to cause the varying of the intensity of the optical field transmitted on the Drop port. In the example considered, the extinction ratio of the modulator is 6.8 dB for a variation of effective index of $2.10^{-4}$. In addition, it should be noted that the chirp parameter α calculated is equal to 2.4.

The FIG. 12 is a graph illustrating the evolution of the modulus of the transfer function known as Drop function, that is to say the variation of the intensity transmitted at the Through port, depending on the wavelength of the light at the input of the ring 216. The curve represented in dotted line illustrates the evolution of the transfer function modulus with no variation of the effective index of the ring 216 whereas the curve represented in solid line shows the evolution of the transfer function modulus in the presence of a variation of the effective index of the ring 216 of $2.10^{-4}$. In the context of this simulation, the characteristic values taken for the ring 216 are R=5 μm, L=0, P=2 dB/cm, k1=0.2 and k2=0. The outcome observed is a shift of the minimum of the transfer function.

Under the same conditions for simulations, the FIG. 13 is a graph showing the evolution of the modulus of the transfer function known as Through function as well as of the phase of the transfer function known as Through function at the resonance wavelength as a function of the effective index Neff of the ring 216. It appears that it is possible to cause the varying of the intensity of the optical field transmitted on the Through port. In the example considered, the extinction ratio of the modulator is 25 dB for a variation of effective index of $2.10^{-4}$. In addition, it should be noted that the chirp parameter α is very large and variable over time.

From the standpoint of manufacturing technology, in a general manner, the ring modulator 212 may possibly be manufactured with any technology demonstrating an electro-optical effect, that is to say a change in the effective index of the ring waveguide under the effect of a voltage (or of a current). Indium phosphide (often referred to by its chemical symbol InP) or lithium niobate (often referred to by its chemical symbol LiNbO3) are examples of developed technology showing an electro-optical effect. Silicon photonics technology also offers such electro-optical properties: thus, it is possible to modulate the effective index of a silicon waveguide in which one or more junctions PN or PIN are formed, by applying a voltage modulated across the terminals of this (or these junctions) PN or PIN. When the ring resonator modulator is built using the "silicon photonics" technology, a PN or PIN junction is thus formed on the ring waveguide (along the waveguide or transversely relative to the waveguide). In the case of a junction formed along the waveguide, the inner zone is, for example made of P doped silicon (or N doped), and the outer zone of the ring is made of N doped silicon (P doped respectively).

6.3—Binary Phase-Shift Keying Unit

A binary phase-shift keying unit includes a modulating unit of the Mach-Zehnder type or a resonant ring modulator.

During operation, the modulating unit makes it possible to obtain a modulation of the BPSK (Binary Phase-Shift Keying) type.

Such modulating units are in particular described in the document titled "DPSK Modulation Using a Microring Modulator", CLEO 2011, CTuN4 paper written by K. Padmaraju et al.

6.4—Modulating Unit Working in Multiple Wavelengths

According to one particular example, the modulating unit includes two modulators capable of operating for two different resonance lengths.

For example, the two modulators are two resonant ring modulators, the resonance length of which is different.

7—Specific Examples

7.1—Case for which K=2

In this section, k is equal to 2.

The three approaches previously developed for the case where k is even apply here, but below, only the first approach is used.

Figure 23:
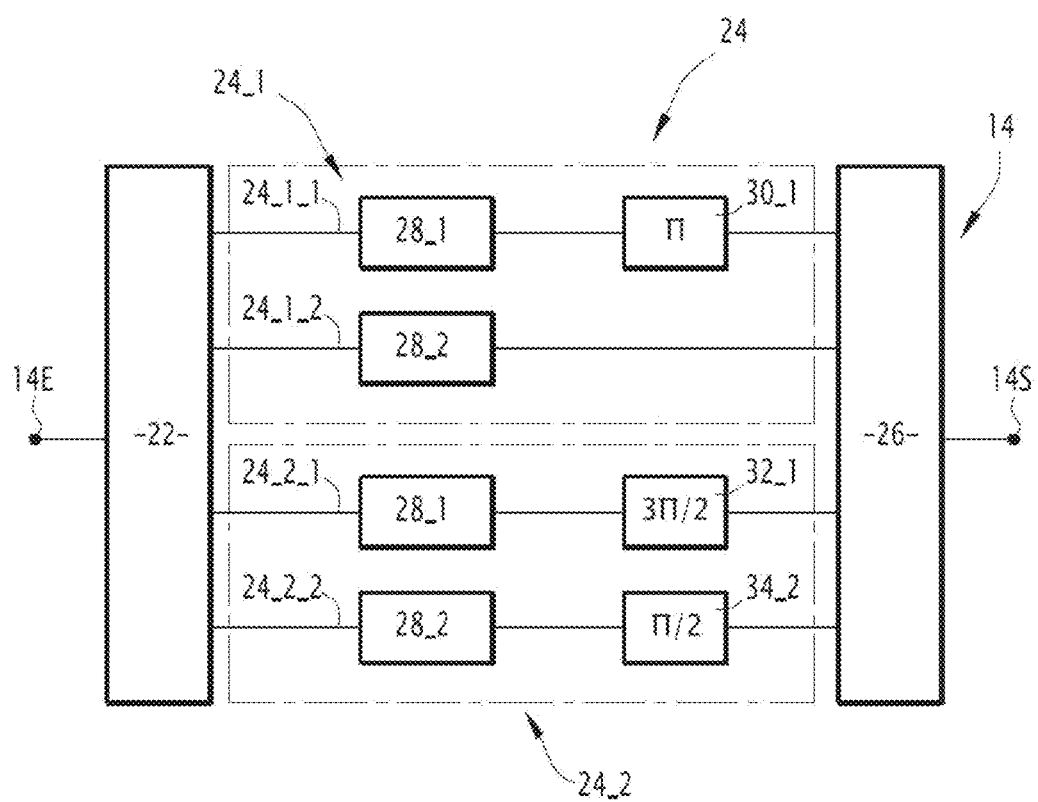
FIG. 23, a diagrammatic illustration of a modulating system capable of generating a quadrature amplitude modulation able to be represented by a constellation with $4^k$ states for an integer k equal to 2.

The corresponding diagram is shown in FIG. 23.

According to the first approach, the first integer N1 is equal to 2, the second integer N2 is equal to 1 and the third integer N3 is equal to 2.

The modulating system 14 includes two first optical modulating channels 24_1, the first optical modulating channel 24_1_1 that is identified by index 1 and the first optical modulating channel 24_1_2 that is identified by index 2. The modulating system 14 also includes two second optical modulating channels 24_2, the second optical modulating channel 24_2_1 that is identified by index 1 and the second optical modulating channel 24_2_2 that is identified by index 2.

The first optical modulating channel 24_1_1 that is identified by index 1 includes the first modulating device 28_1 and the $\pi$ phase shifting unit. The first optical modulating channel 24_1_2 that is identified by index 2 includes the second modulating device 28_2.

The second optical modulating channel 24_2_1 that is identified by index 1 includes the first modulating device 28_1 and the $3\pi/2$ phase shifting unit. The second optical modulating channel 24_1_2 that is identified by index 2 includes the second modulating device 28_1 and the $\pi/2$ phase shifting unit.

The operation of the modulating system 14 will now be described.

Each first modulating device 28_1 operates between a first value one $V_{11}$ and a first value two $V_{12}$ respectively given by:

$$V_{11} = \frac{E}{2} + \frac{E}{2^1} = \frac{E}{2} + \frac{E}{2} = E$$

$$V_{12} = \frac{E}{2} - \frac{E}{2^1} = \frac{E}{2} - \frac{E}{2} = 0$$

Each second modulating device 28_2 operates between a second value one $V_{21}$ and a second value two $V_{22}$ respectively given by:

$$V_{21} = \frac{E}{2} + \frac{E}{2^2} = \frac{E}{2} + \frac{E}{4} = \frac{3E}{4}$$

$$V_{22} = \frac{E}{2} - \frac{E}{2^2} = \frac{E}{2} - \frac{E}{4} = \frac{E}{4}$$

On the first optical channels, me presence of me $\pi$ phase shifting unit on the first optical modulating channel 24_1_1 identified by index 1 makes it possible to generate constructive or destructive interferences. This makes it possible to generate four output amplitude levels, i.e., −3E/4, −E/4, E/4 and 3E/4. These four amplitude levels are associated with the real component.

Symmetrically, for the second optical channels, the presence of the $\pi$ phase shifting unit on the second optical modulating channel 24_2_1 identified by index 2 makes it possible to generate constructive or destructive interferences. This makes it possible to generate four output amplitude levels, i.e., −3E/4, −E/4, E/4 and 3E/4. These four amplitude levels are associated with the quadrature component due to the presence of the $\pi/2$ phase shifting unit. The associated states are therefore −3E/4.j, −E/4.j, E/4.j and 3E/4.j.

Having four values along the real component and four values along the quadrature component makes it possible to obtain a constellation with $4^2=16$ states, i.e., the constellation shown in FIG. 1.

7.2—Case for which K=3

In this section, k is equal to 3.

The three approaches previously developed for the case where k is odd apply here, but below, only the first approach is used.

Figure 24:
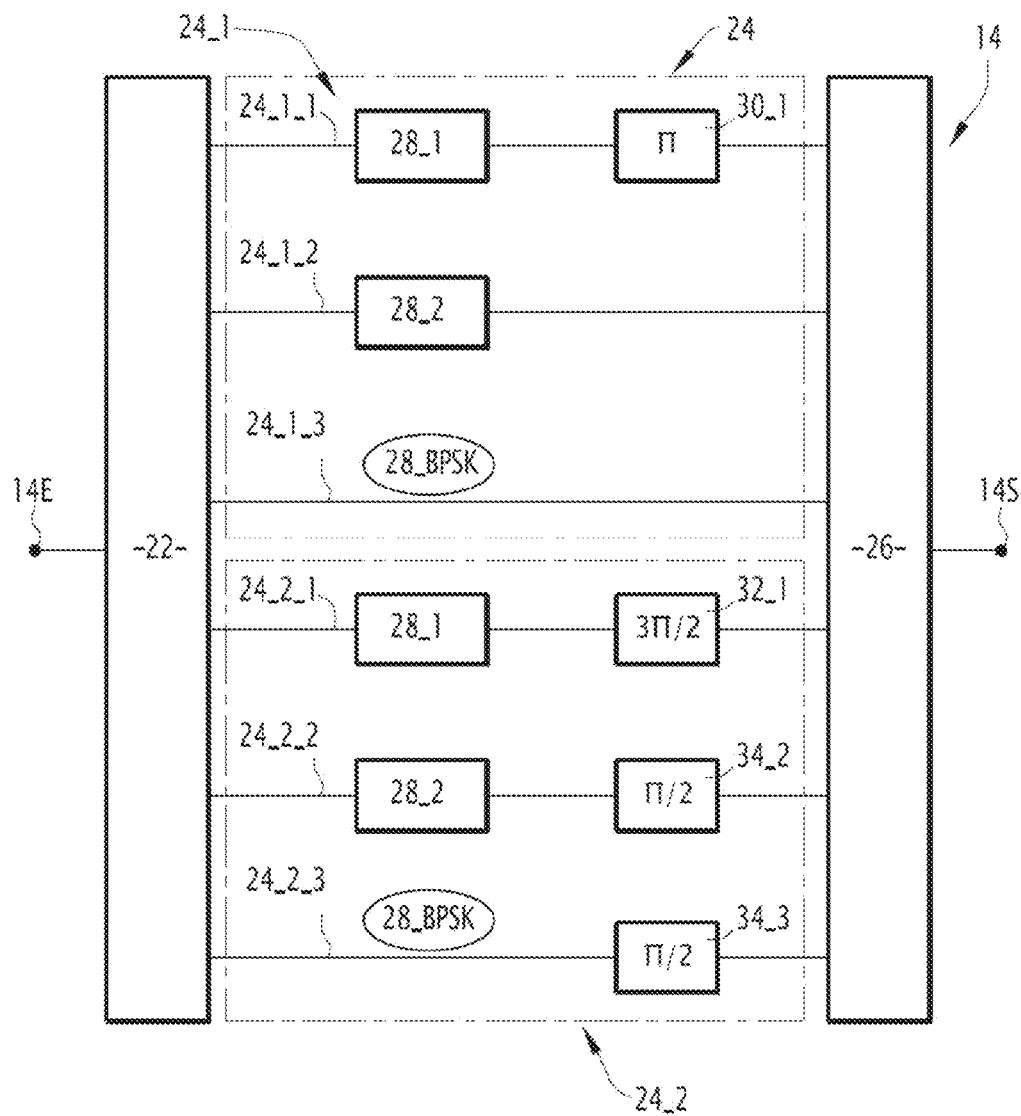
FIG. 24, a diagrammatic illustration of a modulating system capable of generating a quadrature amplitude modulation able to be represented by a constellation with $4^k$ states for an integer k equal to 3, and FIG. 25, a diagrammatic illustration of a modulating system capable of generating a quadrature amplitude modulation able to be represented by a constellation with $4^k$ states for an integer k equal to 4.

The corresponding diagram is shown in FIG. 24.

According to the first approach, the first integer N1 is equal to 3, the second integer N2 is equal to 1 and the third integer N3 is equal to 2.

The modulating system 14 includes three first optical modulating channels 24_1, the first optical modulating channel 24_1_1 that is identified by index 1 and the first optical modulating channel 24_1_2 that is identified by index 2 and the first optical modulating channel 24_1_3 that is identified by index 3.

The modulating system 14 also includes three second optical modulating channels 24_2, the second optical modulating channel 24_2_1 that is identified by index 1 and the second optical modulating channel 24_2_2 that is identified by index 2 and the third optical modulating channel 24_2_3 that is identified by index 3.

The first optical modulating channel 24_1_1 that is identified by index 1 includes the first modulating device 28_1 and the first π phase shifting unit. The first optical modulating channel 24_1_2 that is identified by index 2 includes the second modulating device 28_2. The first optical modulating channel 24_1_3 that is identified by index 3 includes the third modulating device 28_3.

The second optical modulating channel 24_2_1 that is identified by index 1 includes the first modulating device 28_1 and the first 3π/2 phase shifting unit. The second optical modulating channel 24_1_2 that is identified by index 2 includes the second modulating device 28_1 and the second π/2 phase shifting unit. The first optical modulating channel 24_1_3 that is identified by index 3 includes the third modulating device 28_3 and the second π/2 phase shifting unit.

The operation of the modulating system 14 will now be described.

Each first modulating device 28_1 operates between a first value one $V_{11}$ and a first value two $V_{12}$ respectively given by:

$$V_{11} = \frac{E}{2} + \frac{E}{2^1} = \frac{E}{2} + \frac{E}{2} = E$$

$$V_{12} = \frac{E}{2} - \frac{E}{2^1} = \frac{E}{2} - \frac{E}{2} = 0$$

Each second modulating device 28_2 operates between a second value one $V_{21}$ and a second value two $V_{22}$ respectively given by:

$$V_{21} = \frac{E}{2} + \frac{E}{2^2} = \frac{E}{2} + \frac{E}{4} = \frac{3E}{4}$$

$$V_{22} = \frac{E}{2} - \frac{E}{2^2} = \frac{E}{2} - \frac{E}{4} = \frac{E}{4}$$

Each third device 28_BPSK operates between a first value of E and a second value of −E/2.

On the first optical channels, the presence of the π phase shifting unit on the first optical modulating channel 24_1_1 identified by index 1 makes it possible to generate constructive or destructive interferences. This makes it possible to generate eight output amplitude levels, which are −7E/4, −5E/4, −3E/4, −E/4, E/4 et 3E/4, 5E/4 and 7E/4. These eight amplitude levels are associated with the real component.

Symmetrically, for the second optical channels, the presence of the π phase shifting unit on the second optical modulating channel 24_2_1 identified by index 2 makes it possible to generate constructive or destructive interferences. This makes it possible to generate four output amplitude levels, which are −7E/4, −5E/4, −3E/4, −E/4, E/4, 3E/4, 5E/4 and 7E/4. These eight amplitude levels are associated with the quadrature component due to the presence of the π/2 phase shifting unit. The associated states are therefore −7E/4.j, −5E/4.j, −3E/4.j, −E/4.j, E/4.j, 3E/4.j, 5E/4.j and 7E/4.j.

Having eight values along the real component and eight values along the quadrature component makes it possible to obtain a constellation with $4^3=64$ states.

7.3—Case for which K=4

In this section, k is equal to 4.

The three approaches previously developed for the case where k is even apply here, but below, only the first approach is used.

Figure 25:
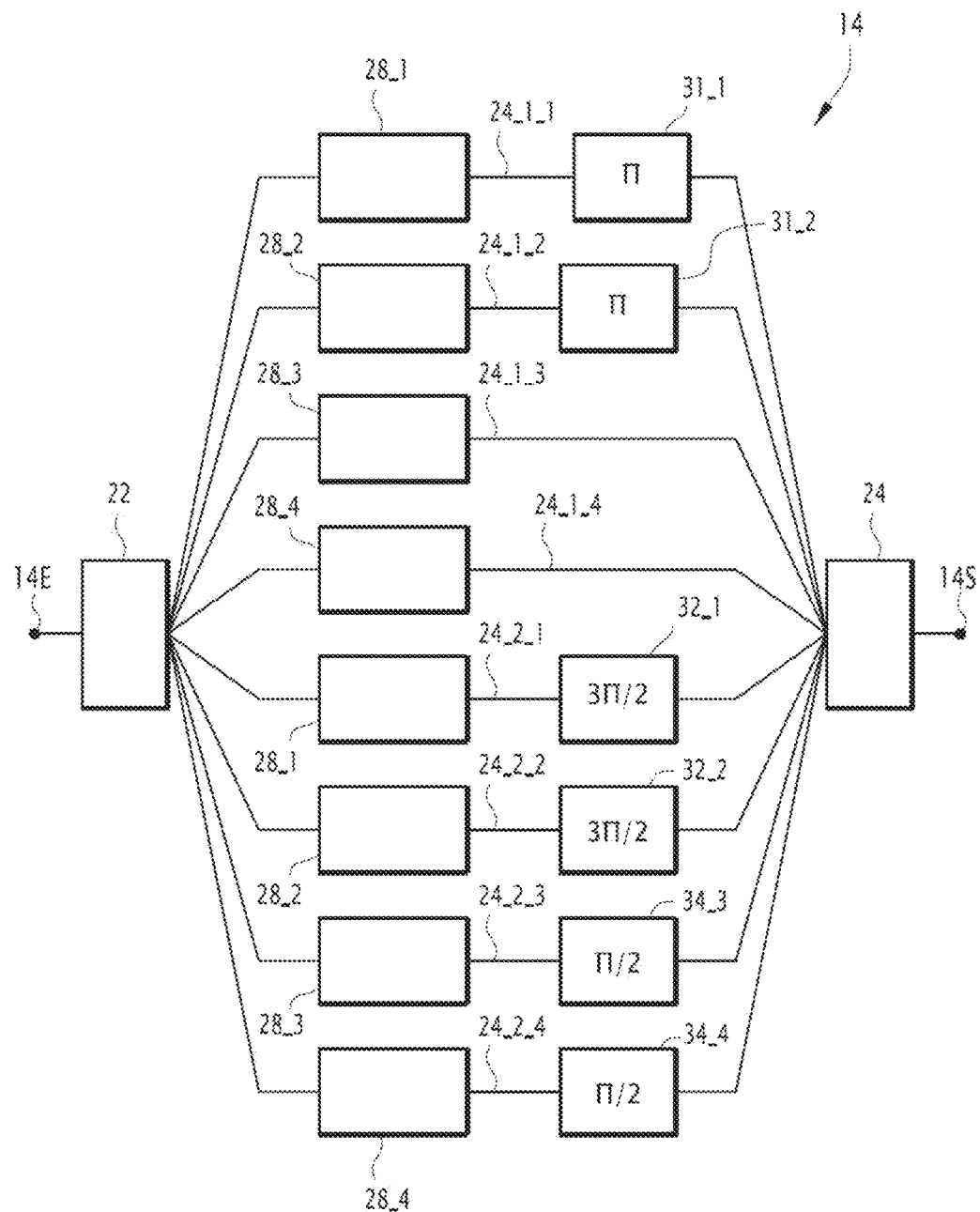

The corresponding diagram is shown in FIG. 25.

According to the first approach, the first integer N1 is equal to 4, the second integer N2 is equal to 2 and the third integer N3 is equal to 4.

The modulating system 14 includes four first optical modulating channels 24_1, the first optical modulating channel 24_1_1 that is identified by index 1 and the first optical modulating channel 24_1_2 that is identified by index 2 and the first optical modulating channel 24_1_3 that is identified by index and the first optical modulating channel 24_1_4 that is identified by index 4. The modulating system 14 also includes four second optical modulating channels 24_2, the second optical modulating channel 24_2_1 that is identified by index 1 and the second optical modulating channel 24_2_2 that is identified by index 2, the second optical modulating channel 24_2_3 that is identified by index 3 and the second optical modulating channel 24_2_4 that is identified by index 4.

The first optical modulating channel 24_1_1 that is identified by index 1 includes the first modulating device 28_1 and the first π phase shifting unit. The first optical modulating channel 24_1_2 that is identified by index 2 includes the second modulating device 28_2 and the second π phase shifting unit. The first optical modulating channel 24_1_3 that is identified by index 3 includes the third modulating device 28_3. The first optical modulating channel 24_1_4 that is identified by index 4 includes the fourth modulating device 28_4.

The second optical modulating channel 24_2_1 that is identified by index 1 includes the first modulating device 28_1 and the first 3π/2 phase shifting unit. The second optical modulating channel 24_2_2 that is identified by index 2 includes the second modulating device 28_2 and the second 3π/2 phase shifting unit. The second optical modulating channel 24_1_3 that is identified by index 3 includes the third modulating device 28_3 and the third π/2 phase shifting unit. The second optical modulating channel 24_1_4 that is identified by index 4 includes the fourth modulating device 28_4 and the fourth π/2 phase shifting unit.

The operation of the modulating system 14 will now be described.

Each first modulating device 28_1 operates between a first value one $V_{11}$ and a first value two $V_{12}$ respectively given by:

$$V_{11} = \frac{E}{2} + \frac{E}{2^1} = \frac{E}{2} + \frac{E}{2} = E$$

$$V_{12} = \frac{E}{2} - \frac{E}{2^1} = \frac{E}{2} - \frac{E}{2} = 0$$

Each second modulating device 28_2 operates between a second value one $V_{21}$ and a second value two $V_{22}$ respectively given by:

$$V_{21} = \frac{E}{2} + \frac{E}{2^2} = \frac{E}{2} + \frac{E}{4} = \frac{3E}{4}$$

$$PV_{22} = \frac{E}{2} - \frac{E}{2^2} = \frac{E}{2} - \frac{E}{4} = \frac{E}{4}$$

Each third modulating device 28_3 operates between a third value one $V_{31}$ and a third value two $V_{32}$ respectively given by:

$$V_{31} = \frac{E}{2} + \frac{E}{2^3} = \frac{E}{2} + \frac{E}{8} = \frac{5E}{8}$$

$$V_{32} = \frac{E}{2} - \frac{E}{2^3} = \frac{E}{2} - \frac{E}{8} = \frac{3E}{8}$$

Each fourth modulating device 28_4 operates between a fourth value one $V_{41}$ and a fourth value two $V_{42}$ respectively given by:

$$V_{14} = \frac{E}{2} + \frac{E}{2^4} = \frac{E}{2} + \frac{E}{16} = \frac{9E}{16}$$

$$V_{24} = \cdot \frac{E}{2} - \frac{E}{2^4} = \frac{E}{2} - \frac{E}{16} = \frac{7E}{16}$$

On the first optical channels, the presence of the first $\pi$ phase shifting unit and the second $\pi$ phase shifting unit make it possible to generate constructive or destructive interferences. This makes it possible to generate sixteen output amplitude levels, which are −15E/16, −13E/16, −11E/16, −9E/16, −7E/16, −5E/16, −3E/16, −E/16, E/16, 3E/16, 5E/16, 7E/16, 9E/16, 11E/16, 13E/16 and 15E/16. These sixteen amplitude levels are associated with the real component.

Symmetrically, on the second optical channels, sixteen amplitude levels, which are −15E/16, −13E/16, −11E/16, −9E/16, −7E/16, −5E/16, −3E/16, −E/16, E/16, 3E/16, 5E/16, 7E/16, 9E/16, 11E/16, 13E/16 and 15E/16, are generated. These sixteen amplitude levels are associated with the quadrature component due to the presence of the $\pi/2q$ phase shifting unit. The associated states are therefore −15E/16.j, −13E/16.j, −11E/16.j, −9E/16.j, −7E/16.j, −5E/16.j, −3E/16.j, −E/16.j, E/16.j, 3E/16.j, 5E/16.j, 7E/16.j, 9E/16.j, 11E/16.j, 13E/16.j and 15E/16.j.

Having sixteen values along the real component and sixteen values along the quadrature component makes it possible to obtain a constellation with $16*16=256=4^4$ states.

From these specific examples, one skilled in the art will understand that it is possible to generalize for cases where the integer k is strictly greater than 4 by using a setup comprising the appropriate elements.

The invention claimed is:

1. A modulating system adapted to generate a multi-level quadrature amplitude modulation that can be shown by a constellation with $4^k$ states, k being a positive integer greater than or equal to 2, the modulating system comprising:
a first number of first optical channels, each of the first optical channels comprising a modulating device, and
a second number of first optical channels further each including a first phase shifting unit, the first phase shifting unit being capable of introducing a phase shift of $\pi$,
a first number of second optical channels, each of the second optical channels being associated bijectively with one of the first optical channels, each of the second optical channels comprising the same elements as the first optical channel with which the second optical channel is associated and a second phase shifting unit, the second phase shifting unit being able to introduce a phase shift of $\pi/2$,
the first number being equal to the integer k, and the second number is equal to the quotient of the Euclidean division of the integer k by the number 2.

2. The system according to claim 1, wherein the integer k is an even number and wherein each modulating device includes an amplitude modulator only.

3. The system according to claim 1, wherein the integer k is an odd number and wherein the assembly of modulating devices of the system is divided into two subassemblies, each modulating device of the first subassembly being an amplitude modulator only and the modulating devices of the second assembly being part of a binary phase change modulation unit, the first subassembly including two times the second number of modulating devices and the second subassembly including two modulating devices.

4. The system according to claim 1, wherein the optical modulating devices belonging to the first optical channels are sequenced in a sequence that can be represented by an index varying between 1 and two times the second number, the i-th optical modulating device working between an i-th first modulation value and an i-th second modulation value, for any integer i varying between 1 and two times the second number, the i-th first modulation values $V_{1i}$ and i-th second modulation values $V_{2i}$ being defined by the following formulas:

$$V_{1i} = \frac{E}{2} + \frac{E}{2^i}$$

$$V_{2i} = \frac{E}{2} - \frac{E}{2^i}$$

where:
E is the field injected at the input of the i-th modulation device, and
"." designates the multiplication function.

5. The system according to claim 1, wherein the optical modulating devices belonging to the second optical channels are sequenced in a sequence that can be represented by an index varying between 1 and two times the second number, the i-th optical modulating device working between an i-th first modulation value and an i-th second modulation value, for any integer i varying between 1 and two times the second number, the i-th first modulation values $V_{1i}$ and i-th second modulation values $V_{2i}$ being defined by the following formulas:

$$V_{1i} = \frac{E}{2} + \frac{E}{2^i}$$

$$V_{2i} = \frac{E}{2} - \frac{E}{2^i}$$

where:
E is the field injected at the input of the i-th modulation device, and
"." designates the multiplication function.

6. The system according to claim 1, wherein each optical modulating device includes a Mach-Zehnder modulator or an electro-absorption modulator.

7. The system according to claim 1, wherein each optical modulating device includes a unit generating a modulation of an optical signal, the unit comprising:
a first resonant ring modulator including:
a first waveguide having an input and an output,
a first ring waveguide, called first ring, the first ring being optically coupled to the first waveguide and having a first effective index, and
a first control device able to modulate the first effective index of the first ring according to a first control law, and
a second resonant ring modulator including:
a second waveguide having an input and an output, the input of the second waveguide being connected to the output of the first waveguide,
a second ring waveguide, called second ring, the second ring being optically coupled to the second waveguide and having a second effective index, and being independent of the first ring, and
a second control device able to modulate the second effective index of the second ring according to a second control law,
the modulation unit having at least one characteristic influencing the chirp introduced by the modulation unit, the characteristics of the modulation unit being chosen so as to minimize the absolute value of the chirp introduced by the modulation unit.

8. The system according to claim 1, wherein the modulating device includes at least two modulation units able to operate on two different wavelengths.

9. The system according to claim 1, wherein the integer k is equal to 2, 3 or 4.

10. An architecture including:
an optical source,
a modulating system according to claim 1, the optical source being able to illuminate the modulating system.

* * * * *